US012615526B2

(12) United States Patent
Dimnik et al.

(10) Patent No.: US 12,615,526 B2
(45) Date of Patent: Apr. 28, 2026

(54) DEVICE TESTING

(71) Applicant: Nokia Solutions and Networks Oy, Espoo (FI)

(72) Inventors: Riikka Karoliina Dimnik, Espoo (FI); Rafael Cauduro Dias De Paiva, Aalborg (DK); Michel Robert, Nozay (FR); Lars Dalsgaard, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 342 days.

(21) Appl. No.: 18/550,545

(22) PCT Filed: Mar. 8, 2022

(86) PCT No.: PCT/FI2022/050145
§ 371 (c)(1),
(2) Date: Sep. 14, 2023

(87) PCT Pub. No.: WO2022/207966
PCT Pub. Date: Oct. 6, 2022

(65) Prior Publication Data
US 2024/0147275 A1 May 2, 2024

(30) Foreign Application Priority Data
Apr. 1, 2021 (FI) ...................................... 20215408

(51) Int. Cl.
*H04B 17/15* (2015.01)
*H04B 17/17* (2015.01)
(Continued)

(52) U.S. Cl.
CPC ............ *H04W 24/06* (2013.01); *H04B 17/17* (2015.01); *H04B 17/191* (2023.05);
(Continued)

(58) Field of Classification Search
CPC .......... H04B 17/0082–3913; H04W 8/22–245; H04W 24/02–10; H04W 28/02–26;
(Continued)

(56) References Cited

U.S. PATENT DOCUMENTS 10,869,336 B2 12/2020 Deogun et al.
10,925,093 B2 2/2021 Jose et al.
(Continued)

FOREIGN PATENT DOCUMENTS

WO 2019/218142 A1 11/2019

OTHER PUBLICATIONS

"On CCA model in NR-U test cases", 3GPP TSG-RAN WG4 Meeting #98-e, R4-2102527, Agenda Item: 7.1.6.3.1, Ericsson, Jan. 25-Feb. 5, 2021, 6 pages. (Year: 2021).*
(Continued)

*Primary Examiner* — Timothy J Weidner
(74) *Attorney, Agent, or Firm* — Nokia Technologies Oy

(57) ABSTRACT

An apparatus (10) comprising means for: enabling testing of at least one user equipment (110, 12) over a plurality of radio frames by: determining (202), for at least one candidate position in a current radio frame, if one or more signals are to be transmitted to the at least one user equipment, based, at least in part, on one or more probabilities associated with the at least one candidate position in the current radio frame; if it is determined, for at least one candidate position in the current radio frame, that one or more signals are to be transmitted to the at least one user equipment, transmitting (204) one or more signals to the at least one user equipment using the at least one candidate position in the current radio frame; if it is determined, for at least one candidate position in the current radio frame, that one or more signals are not be transmitted to the at least one user equipment, determining (206) if a maximum number of transmission failures has
(Continued)

occurred, wherein a transmission failure is determined to have occurred when it is determined that no signals are to be transmitted in a current radio frame; and if it is determined that a maximum number of transmission failures has occurred, transmitting (208) one or more signals to the at least one user equipment using at least one candidate position in the current radio frame.

12 Claims, 11 Drawing Sheets

(51) Int. Cl.

| | |
|---|---|
| *H04W 24/06* | (2009.01) |
| *H04W 24/08* | (2009.01) |
| *H04W 74/0808* | (2024.01) |
| *H04W 74/0816* | (2024.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
 CPC ....... *H04W 24/08* (2013.01); *H04W 74/0816* (2013.01); *H04W 74/0825* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
 CPC . H04W 56/00–003; H04W 72/02–569; H04W 74/002–0891; H04W 84/02–16; H04W 88/005–188; H04W 92/02–04; H04W 92/10
 See application file for complete search history.

(56) References Cited

U.S. PATENT DOCUMENTS

| | | | |
|---|---|---|---|
| 2020/0037230 A1 | 1/2020 | Chen et al. | |
| 2020/0053781 A1 | 2/2020 | Pan et al. | |
| 2020/0221495 A1 | 7/2020 | Chen et al. | |
| 2020/0374837 A1 | 11/2020 | Harada et al. | |
| 2020/0413356 A1 | 12/2020 | Wang et al. | |
| 2022/0377683 A1* | 11/2022 | Myung | H04W 74/0816 |

OTHER PUBLICATIONS

Extended European Search Report received for corresponding European Patent Application No. 22779209.0, dated Dec. 23, 2024, 12 pages.

"Draft CR on CCA model for NR-U", 3GPP TSG-RAN WG4 Meeting #99-e, R4-2108264, Nokia, May 19-27, 2021, 5 pages.

"On CCA model in NR-U test cases", 3GPP TSG-RAN WG4 Meeting #98-e, R4-2102527, Agenda Item: 7.1.6.3.1, Ericsson, Jan. 25-Feb. 5, 2021, 6 pages.

"Discussion on NR-U RRM test configurations", 3GPP TSG-RAN WG4 Meeting # 98-e, R4-2101133, Agenda item: 7.1.6.2, Nokia, Jan. 25-Feb. 5, 2021, 9 pages.

"Performance requirements in NR-U", 3GPP TSG-RAN WG4 Meeting #98-e, R4-2102921, Agenda item: 7.1.6.1, Qualcomm Incorporated, Jan. 25-Feb. 5, 2021, 9 pages.

Office action received for corresponding Indian Patent Application No. 202347073897, dated Mar. 6, 2025, 7 pages.

"3rd Generation Partnership Project; Technical Specification Group Radio Access Network; NR; Requirements for support of radio resource management (Release 17)", 3GPP TS 38.133, V17.0.0, Dec. 2020, 1812 pages.

"Email discussion summary for [98e][206] NR_unlic_RRM_2", 3GPP TSG-RAN WG4 Meeting # 98-e, R4-2103445, Agenda Item: 7.1.6, Nokia, Jan. 25-Feb. 5, 2021, 143 pages.

"Draft TC NR-U inter-frequency measurements", 3GPP TSG-RAN WG4 Meeting#98-bis-e, R4-210xxxx, Nokia, Apr. 12-20, 2021, 3 pages.

"On remaining details of NR-U RRM test configurations", 3GPP TSG-RAN WG4 Meeting#98-bis-e, R4-21xxxxx, Agenda item: xxx, Nokia, Apr. 12-20, 2021, 5 pages.

"Cell selection after consecutive UL LBT failures", 3GPP TSG-RAN2 Meeting #109 electronic, R2-2001546, Agenda item: 6.2.3.1, LG Electronics Inc, Feb. 24-Mar. 6, 2020, pp. 1-2.

Office action received for corresponding Finnish Patent Application No. 20215408, dated Dec. 7, 2021, 9 pages.

Maglogiannis et al., "An adaptive LTE listen-before-talk scheme towards a fair coexistence with Wi-Fi in unlicensed spectrum", Telecommunication Systems, vol. 68, 2018, pp. 701-721.

Hirzallah et al., "5G New radio unlicensed: challenges and evaluation", IEEE Transactions on Cognitive Communications and Networking, vol. 7, No. 3, Sep. 2021, pp. 689-701.

International Search Report and Written Opinion received for corresponding Patent Cooperation Treaty Application No. PCT/FI2022/050145, dated May 30, 2022, 16 pages.

Lagen et al., "New Radio Beam-Based Access to Unlicensed Spectrum: Design Challenges and Solutions", IEEE Communications Surveys & Tutorials, vol. 22, No. 1, Firstquarter 2020, pp. 8-37.

* cited by examiner 110, 12

10

200

DETERMINING IF ONE OR MORE SIGNALS ARE TO BE TRANSMITTED — 202

20

TRANSMIT ONE OR MORE SIGNALS — 204

DETERMINE IF MAX NUMBER OF TRANSMISSION FAILURES HAS OCCURED — 206

20

TRANSMIT ONE OR MORE SIGNALS — 208

20

DETERMINE BEHAVIOR — 210

PROVIDE RESULTS — 212

DEVICE TESTING

RELATED APPLICATION

This application was originally filed as PCT Application No. PCT/FI2022/050145, filed on Mar. 8, 2022, which claims priority from FI Application No. 20215408, filed on Apr. 1, 2021, each of which is incorporated herein by reference in its entirety.

TECHNOLOGICAL FIELD

Embodiments of the present disclosure relate to device testing. Some relate to device testing in user equipment.

BACKGROUND

A wireless network comprises a plurality of network nodes including terminal nodes and access nodes. Communication between the terminal nodes and the access nodes is wireless.

Testing of a terminal node can be performed to, for example, check that the terminal node can fulfil one or more requirements.

In some circumstances, it may be desirable to modify or enhance how testing of a terminal node is performed.

SUMMARY

According to various, but not necessarily all, embodiments there is provided an apparatus comprising means for:

enabling testing of at least one user equipment over a plurality of radio frames by: determining, for at least one candidate position in a current radio frame, if one or more signals are to be transmitted to the at least one user equipment, based, at least in part, on one or more probabilities associated with the at least one candidate position in the current radio frame;

if it is determined, for at least one candidate position in the current radio frame, that one or more signals are to be transmitted to the at least one user equipment, transmitting one or more signals to the at least one user equipment using the at least one candidate position in the current radio frame;

if it is determined, for at least one candidate position in the current radio frame, that one or more signals are not be transmitted to the at least one user equipment, determining if a maximum number of transmission failures has occurred, wherein a transmission failure is determined to have occurred when it is determined that no signals are transmitted or to be transmitted in a current radio frame; and if it is determined that a maximum number of transmission failures has occurred, transmitting one or more signals to the at least one user equipment using at least one candidate position in the current radio frame.

In some examples, determining, for at least one candidate position in a current radio frame, if one or more signals are to be transmitted to the at least one user equipment comprises determining, for a first candidate position in a current radio frame, if one or more signals are to be transmitted to the at least one user equipment based, at least in part, on an associated probability of successful transmission.

In some examples, determining, for at least one candidate position in the current radio frame, if one or more signals are to be transmitted to the at least one user equipment comprises determining, for a plurality of candidate positions in the current radio frame, if one or more signals are to be transmitted to the at least one user equipment.

In some examples, determining if a maximum number of transmission failures has occurred comprises determining if the number of consecutive transmission failures has reached a threshold and/or determining if the number of transmission failures within a window of one or more previous frames has reached a threshold.

In some examples, the size of the window of the one or more previous frames is fixed or variable.

In some examples, the size of the window is determined based, at least in part, on at least one radio resource management requirement and/or one or more requirements under test.

In some examples, the means are configured to record a transmission result for the current frame and wherein determining if a maximum number of transmission failures has occurred comprises analysing the transmission results for the radio frames in the window.

In some examples, different candidate positions in the current radio frame have same or different associated probabilities.

In some examples, transmitting one or more signals using at least one candidate position in the current radio frame if it is determined that a maximum number of transmission failures has occurred, comprises transmitting one or more signals in the last candidate position in the current radio frame.

In some examples, transmitting one or more signals comprises transmitting a synchronisation signal block.

In some examples, the means are configured to: if it is determined, for a candidate position in the current radio frame, that one or more signals are to be transmitted to the at least one user equipment, transmit one or more further signals in a candidate position of the current radio frame subsequent to the at least one candidate position in which it is determined to transmit the one or more signals.

In some examples, the means comprises at least one processor; and at least one memory including computer program code, the at least one memory and computer program code configured to, with the at least one processor, cause performance of the apparatus.

According to various, but not necessarily all, embodiments there is provided a method comprising:

enabling testing of at least one user equipment over a plurality of radio frames by: determining, for at least one candidate position in a current radio frame, if one or more signals are to be transmitted to the at least one user equipment, based, at least in part, on one or more probabilities associated with the at least one candidate position in the current radio frame;

if it is determined, for at least one candidate position in the current radio frame, that one or more signals are to be transmitted to the at least one user equipment, transmitting one or more signals to the at least one user equipment using the at least one candidate position in the current radio frame;

if it is determined, for at least one candidate position in the current radio frame, that one or more signals are not be transmitted to the at least one user equipment, determining if a maximum number of transmission failures has occurred, wherein a transmission failure is determined to have occurred when it is determined that no signals are transmitted or to be transmitted in a current radio frame; and if it is determined that a maximum number of transmission failures has occurred, transmitting one or more signals to the at least one user equipment using at least one candidate position in the current radio frame.

In some examples, determining if a maximum number of transmission failures has occurred comprises determining if the number of consecutive transmission failures has reached a threshold and/or determining if the number of transmission failures within a window of one or more previous frames has reached a threshold.

According to various, but not necessarily all, examples there is provided a computer program comprising instructions for causing an apparatus to perform at least the following:

enabling testing of at least one user equipment over a plurality of radio frames by: determining, for at least one candidate position in a current radio frame, if one or more signals are to be transmitted to the at least one user equipment, based, at least in part, on one or more probabilities associated with the at least one candidate position in the current radio frame;

if it is determined, for at least one candidate position in the current radio frame, that one or more signals are to be transmitted to the at least one user equipment, transmitting one or more signals to the at least one user equipment using the at least one candidate position in the current radio frame;

if it is determined, for at least one candidate position in the current radio frame, that one or more signals are not be transmitted to the at least one user equipment, determining if a maximum number of transmission failures has occurred, wherein a transmission failure is determined to have occurred when it is determined that no signals are transmitted or to be transmitted in a current radio frame; and if it is determined that the maximum number of transmission failures has occurred, transmitting one or more signals to the at least one user equipment using at least one candidate position in the current radio frame.

In some examples, determining if the maximum number of transmission failures has occurred comprises determining if the number of consecutive transmission failures has reached a threshold and/or determining if the number of transmission failures within a window of one or more previous frames has reached a threshold.

In some examples, the computer program stored on a non-transitory computer readable medium.

According to various, but not necessarily all, embodiments there is provided an apparatus comprising at least one processor; and at least one memory including computer program code;

the at least one memory and the computer program code configured to, with the at least one processor, cause the apparatus at least to perform at least a part of one or more methods disclosed herein.

According to various, but not necessarily all, embodiments there is provided an apparatus comprising means for performing at least part of one or more methods disclosed herein.

According to various, but not necessarily all, embodiments there is provided examples as claimed in the appended claims.

The description of a function and/or action should additionally be considered to also disclose any means suitable for performing that function and/or action.

BRIEF DESCRIPTION

Some examples will now be described with reference to the accompanying drawings in which.

ABBREVIATIONS

CCA—Clear Channel Assessment
DL—DownLink
gNB—gNodeB
LBT—Listen Before Talk
$I_w$—Failures/Unavailable samples counter within a window
$I_c$—Counter of consecutive failures/unavailable samples
$I_s$—Successes/Available samples counter within a window
$L_{MAX}$—Maximum number of failures/unavailable samples within a window
LTE—Long Term Evolution
n—Frame number
NR—New Radio
NR-U—NR Unlicensed
P1—Probability of transmission success for a first candidate position
P2—Probability of transmission success for a second candidate position
RLM—Radio Link Monitoring
RRM—Radio Resource Management
SCell—Secondary Cell
$S_{MIN}$—Minimum number of successes/available samples within a window
SSB—Synchronization Signal Block
SSB[n]—SSB status for the nth frame, where 0 if LBT failure, 1 means the first SSB candidate position is used, and 2 means 2nd candidate position is used
UE—User Equipment
$N_{UNAV}$—Maximum number of consecutive unavailable samples
X—Window length for monitoring available/unavailable samples

DETAILED DESCRIPTION

Figure 1:
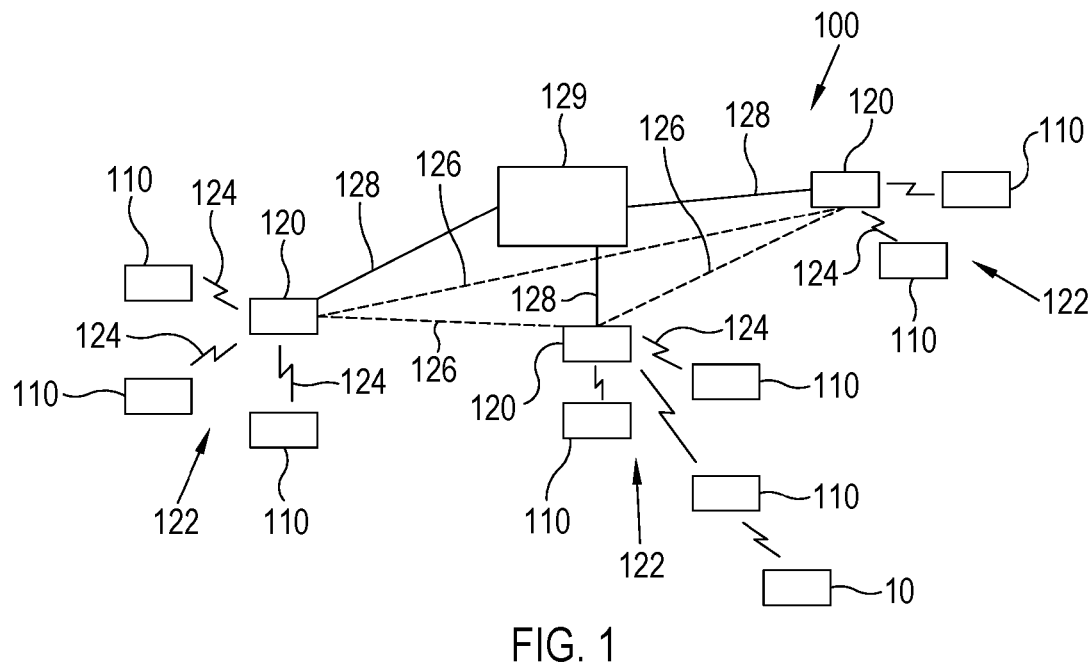
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a telecommunications network, in which at least some of the terminal nodes 110 and access nodes 120 communicate with each other using transmission/reception of radio waves/signals.

The one or more core nodes 129 may, in some examples, communicate with each other. The one or more access nodes 120 may, in some examples, communicate with each other.

The one or more terminal nodes 110 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node(s) 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations (for example, gNBs).

Functionality of a base station may be distributed between a central unit (CU), for example a gNB-CU, and one or more distributed units (DU), for example gNB-DUs.

In the particular example illustrated the network 100 is an Evolved Universal Terrestrial Radio Access network (E-UTRAN). The E-UTRAN consists of E-UTRAN NodeBs (eNBs), providing the E-UTRA user plane and control plane (for example, RRC) protocol terminations towards the UE. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs), providing the user plane and control plane (for example, RRC) protocol terminations towards the UE. The gNBs are interconnected with each other by means of an X2/Xn interface 126. The gNBs are also connected by means of the N2 interface 128 to the Access and Mobility management Function (AMF).

In examples, the network 100 can comprise a combination of E-UTRAN and NG-RAN.

Also illustrated in FIG. 1 is an apparatus 10. In examples, the apparatus 10 can be considered a device and/or equipment and/or a test apparatus and/or a test device and/or test equipment and so on.

In examples the apparatus 10 is configured to test and/or verify one or more terminal nodes 110, such as one or more UEs.

The apparatus 10 can be configured to test and/or verify one or more terminal nodes 110 in any suitable way using any suitable method.

The apparatus 10 can be considered, in some examples, an apparatus 10 for and/or configured to be used for UE certification.

In some examples, the apparatus 10 is configured to emulate and/or simulate an access node 120, such as a gNB, and/or core node 129.

In examples, the apparatus 10 is configured to emulate and/or simulate behavior and/or functionality of an access node 120 and/or core node 129 with and/or towards one or more terminal nodes 110, such as one or more UEs.

In some examples, the apparatus 10 is configured to test and/or verify that one or more terminal nodes 110 can fulfil one or more requirements. For example, the apparatus 10 can be configured to test and/or verify that one or more terminal nodes 110 can fulfil one or more requirements for operating in a network such as network 100.

In examples, the apparatus 10 is configured to test and/or verify that one or more terminal nodes 110 can fulfil one or more RRM performance requirements for operating in a network such as network 100.

In some examples, the apparatus 10 is configured to perform and/or run one or more test cases with one or more terminal nodes 110. For example, the apparatus 10 can be configured to perform and/or run one or more test cases with one or more UEs 12, to test and/or verify that one or more UEs 12 supporting NR-U can fulfill associated requirements, such as SCell activation delay and/or RLM in-sync evaluation period and so on.

In examples, the apparatus 10 is configured to simulate and/or emulate DL transmission failures. For example, apparatus 10 can be configured to simulate DL LBT/CCA failures during testing and/or verification of one or more terminal nodes 110. For purposes of brevity LBT/CCA will be referred to as LBT herein.

In examples, the apparatus 10 is configured to limit, in any suitable way, a number and/or a maximum number of DL LBT failures during testing of one or more terminal nodes 110 to ensure that testing of one or more terminal nodes is not invalidated. For example, in tests and/or test cases where the terminal node 110 behavior with DL LBT failures above a certain level and/or threshold is not to be tested.

In examples, the apparatus 10 is configured to communicate with one or more terminal nodes 110 in any suitable way, for example using wired and/or wireless communication.

Figure 2:
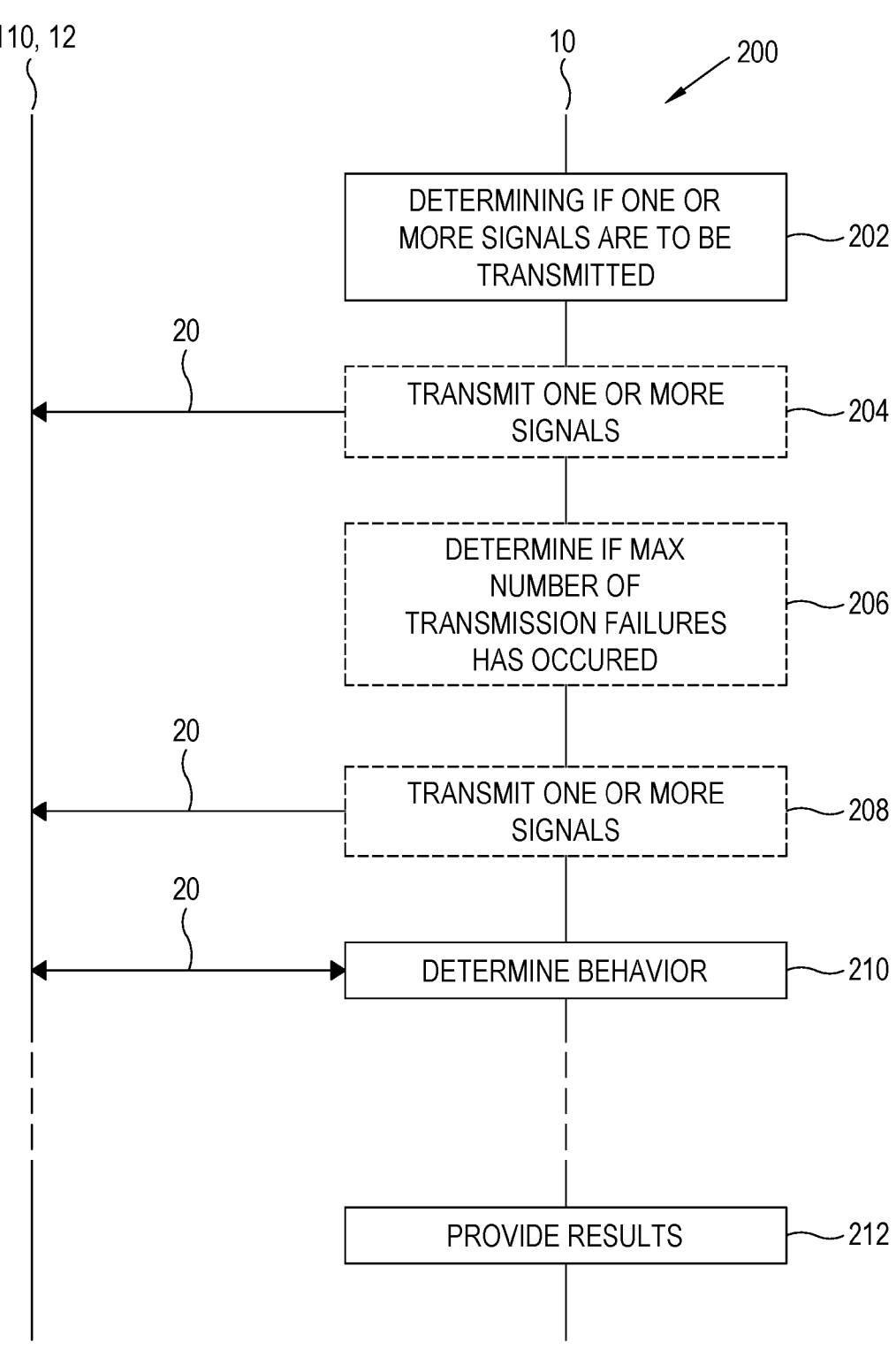
FIG. 2 shows another example of the subject matter described herein.

FIG. 2 illustrates an example of a method 200.

In examples, FIG. 2 can be considered to illustrate a plurality of methods. For example, FIG. 2 illustrates one or more actions at a plurality of actors/entities. In examples, FIG. 2 can be considered to illustrate a plurality of methods performed by the individual actors/entities.

One or more of the features discussed in relation to FIG. 2 can be found in one or more of the other FIGs. During discussion of FIG. 2, reference will be made to other FIGs for the purposes of explanation.

In the example of FIG. 2, a plurality of apparatuses transmit and/or receive one or more signals 20 and/or one or more messages. In examples, any suitable form of communication using any suitable method can be used. For example, wireless and/or wired communication can be used.

In the illustrated example, a terminal node 110, which in the example of FIG. 2 is a UE 12, and an apparatus 10 transmit and/or receive one or more signals 20 and/or one or more messages.

In the example of FIG. 2, apparatus 10 can be as described in relation to FIG. 1 and can be referred to as test equipment.

As FIG. 2 illustrates one or more actions of transmission, FIG. 2 also illustrates the corresponding receiving feature(s)/action(s) and vice versa.

In examples, communications and/or transmissions between elements in FIG. 2 can proceed via any number of intervening elements, including no intervening elements.

In examples, method 200 and/or one or more parts of method 200 can be considered a method of testing a terminal node 110 and/or a method of verifying a terminal node 110 and/or a method of certifying a terminal node 110 and so on.

In some examples, method 200 and/or one or more parts of method 200 can be considered a method of limiting a number of simulated/emulated transmission failures during testing and/or verifying and/or certifying a terminal node 110.

In some examples, method 200 and/or one or more parts of method 200 can be considered a method of enabling testing of at least one user equipment 12 over a plurality of radio frames 14.

Accordingly, in some examples, method 200 can be considered to enable testing of at least one user equipment 12 over a plurality of radio frames 14 by performing one or more blocks of method 200 at least once for a plurality of radio frames 14.

In some examples, one or more blocks of method 200 are performed on a frame-by-frame basis for the plurality of radio frames 14. That is, in examples, one or more blocks of method 200 are performed at least once for a radio frame 14 that is under consideration and then the next radio frame 14 is considered.

In some examples, the radio frame 14 that is currently under consideration can be considered the current radio frame 16.

Figure 3A:
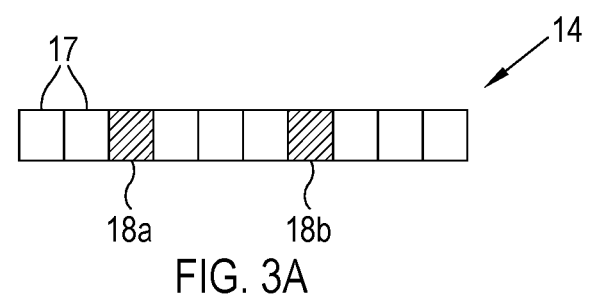
FIG. 3A shows another example of the subject matter described herein.
Figure 3B:
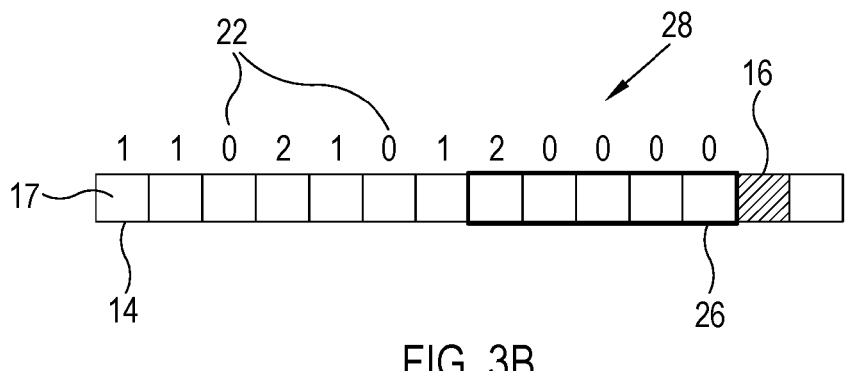
FIG. 3B shows another example of the subject matter described herein.

See, for example, FIG. 3B which schematically shows a plurality of radio frames 14 with a current radio frame 16 highlighted with shading.

In examples, the radio frames 14 have associated positions 17, one or more of which are designated and/or can be considered candidate positions 18 for transmission of one or more signals 20.

Accordingly, a candidate position 18 can be considered a position in a radio frame 14 designated for and/or considered for transmission of one or more signals 20.

See, for example, FIG. 3A which schematically shows a radio frame 14 comprising a plurality of positions 17.

In the example of FIG. 3A, two candidate positions 18a, 18b are highlighted by shading. In examples, candidate position 18a can be considered a first candidate position and candidate position 18b can be considered a second candidate position.

In examples, a radio frame 14 can comprise any suitable number of positions 17 and/or candidate positions 18.

Referring to FIG. 2, at block 202, method 200 comprises determining, for at least one candidate position 18 in a current radio frame 16, if one or more signals 20 are to be transmitted to the at least one user equipment 12, based, at least in part, on one or more probabilities associated with the at least one candidate position 18 in the current radio frame 16.

In the illustrated example, the location of the blocks indicates the entity performing the action(s). For example, in FIG. 2, block 202 is performed at and/or by the test equipment.

In examples, determining if one or more signals 20 are to be transmitted at block 202 can be performed in any suitable way using any suitable method.

As used herein, the term "determining" (and grammatical variants thereof) can include, not least: calculating, computing, processing, deriving, investigating, looking up (for example, looking up in a table, a database or another data structure), ascertaining and the like. Also, "determining" can include receiving (for example, receiving information), accessing (for example, accessing data in a memory) and the like. Also, "determining" can include resolving, selecting, choosing, establishing, and the like.

In examples, if it is determined that one or more signals 20 are to be transmitted at a candidate position 18 in a radio frame 14 it can be considered transmission success for the candidate position 18 in a radio frame 14. Such a transmission success can be considered a position transmission success.

In examples, if it is determined that one or more signals 20 are not to be transmitted at a candidate position 18 in a radio frame 14 it can be considered transmission failure for the candidate position 18 in a radio frame 14. Such a transmission failure can be considered a position transmission failure.

In some examples, determining if one or more signals 20 are to be transmitted can be performed for any suitable number of candidate positions 18 in a radio frame 14. For example, 1, 2 or 3 candidate positions 18 can be considered.

In some examples, determining, for at least one candidate position 18 in a current radio frame 16, if one or more signals 20 are to be transmitted to the at least one user equipment 12 comprises determining, for a first candidate position 18 in a current radio frame 16, if one or more signals 20 are to be transmitted to the at least one user equipment 12 based, at least in part, on an associated probability of successful transmission.

In some examples, determining, for at least one candidate position 18 in the current radio frame 16, if one or more signals 20 are to be transmitted to the at least one user equipment 12 comprises determining, for a plurality of candidate positions 18 in the current radio frame 16, if one or more signals 20 are to be transmitted to the at least one user equipment 12.

In some examples, the number of candidate positions 18 considered can be the same and/or vary between different radio frames 14. For example, the radio frames 14 considered during performance of method 200 can comprise two candidate positions 18.

In examples, consideration of later candidate position(s) 18 in a current radio frame 16 can be dependent on the outcome of determinations in relation to prior candidate position(s) 18 in the current radio frame 16.

In some examples, if it is determined at one or more candidate positions 18 that one or more signals 20 are to be transmitted to the at least one user equipment 12, later candidate position(s) 18 in the current radio frame 16 are not considered and the next radio frame 14 is considered.

For example, if there are two candidate positions 18a and 18b in a current radio frame 16 and it is determined that one or more signals 20 are to be transmitted at the first candidate position 18a, the second candidate position 18b is not considered.

Accordingly, in some examples, later candidate positions 18 in the current radio frame 16 are considered if transmission failures are determined in earlier candidate positions 18 in the current radio frame 16.

In some examples, if it is determined at one or more candidate positions 18 that one or more signals 20 are to be transmitted to the at least one user equipment 12, later candidate position(s) 18 of the current radio frame 16 are considered for transmission of one or more signals 20.

In examples, same or different signal(s) 20 can be transmitted at different candidate positions 18 in a radio frame 14.

For example, if there are two candidate positions 18a and 18b in a current radio frame 16 and it is determined that one or more signals 20 are to be transmitted at the first candidate position 18a, the second candidate position 18b is considered for transmission of same and/or different signal(s).

In some examples, determining, for a candidate position 18 in a current radio frame 16, if one or more signals 20 are to be transmitted to the at least one user equipment 12, based, at least in part, on one or more probabilities associated with the candidate position 18 can be performed in any suitable way using any suitable method.

In some examples, each candidate position 18 in a radio frame 14 has at least one associated probability. In some examples, each candidate position 18 in a radio frame 14 has an associated probability.

In some examples, the one or more associated probabilities can be considered and/or can be considered to represent and/or can be configured to represent a probability of transmission failure and/or transmission success at the associated candidate position 18.

For example, a probability associated with a first candidate position 18 can be considered and/or can be considered to represent and/or can be configured to represent a probability of transmission failure and/or transmission success at the first candidate position 18.

In some examples, the one or more probabilities can be considered and/or can be considered to represent and/or can be configured to represent a probability of LBT failure and/or LBT success at the associated candidate position 18.

For example, a probability associated with a second candidate position 18 can be considered and/or can be considered to represent and/or can be configured to represent a probability of LBT failure and/or LBT success at the second candidate position 18.

In some examples, different candidate positions 18 in the current radio frame 16 have the same or different associated probabilities.

In some examples, it can be randomly determined, based, at least in part, on the associated probability, if one or more signals 20 are to be transmitted at a candidate position 18 in a current radio frame 16.

As used herein the term random is intended to include random and pseudorandom.

In some examples any suitable random procedure can be used in combination/conjunction with the associated probability to determine if one or more signals 20 are to be transmitted at a candidate position 18.

In some examples, the candidate positions 18 have an associated probability value P and any suitable random procedure can be used in combination/conjunction with the associated probability value P to determine, randomly, if one or more signals 20 are to be transmitted at a candidate position 18 in a current radio frame 16.

For example, for a current radio frame 16 with first and second candidate positions 18a and 18b, the first candidate position 18a can have an associated probability P1 and the second candidate position 18b can have an associated probability P2. P1 and P2 can be the same or different.

In examples, for a candidate position 18, a random number can be generated and compared with the associated probability value P to determine if one or more signals 20 are to be transmitted to the at least one user equipment 12 at the candidate position 18.

For example, P can have any suitable value between 0 and 1 (including 0 and 1) and a number between 0 and 1 (including 0 and 1) can be randomly generated and compared to P.

In examples, transmission success or failure at a candidate position 18 can be determined and/or simulated and/or emulated if the randomly generated number is greater than or equal to P, or in some examples, less than or equal to P.

Accordingly, in examples, P can be considered to represent probability of transmission success and/or transmission failure at an associated candidate position 18.

Any suitable value(s) of P can be used for the candidate positions 18. In some examples, the value(s) of P can be chosen in dependence on the circumstances of the test. For example, the value(s) of P can be chosen to simulate and/or emulate an amount of interference leading to probability of LBT failure/success.

A value of P=0 represents all position transmission failures and a value of P=1 represents all position transmission successes.

In some examples, P can have a value in the range 0.5 to 0.95.

With reference to FIG. 3A, the first candidate position 18a can have an associated probability P1 and the second candidate position 18b can have an associated probability P2.

For the radio frame 14 in the example of FIG. 3A, the transmission failure/success probability at the first candidate position 18a is represented by P1 and the transmission failure/success probability at the second candidate position 18b is represented by P2.

For example, in the example of FIG. 3A, P1 can have a value of 0.6 and P2 can have a value of 0.5. If a randomly generated number between 0 and 1 (including 0 and 1) is greater than P1 then it is determined position transmission failure and that one or more signals 20 are not to be transmitted at the first candidate position 18a.

If a randomly generated number between 0 and 1 (include 0 and 1) is less than P2 then it is determined position transmission success and that one or more signals 20 are to be transmitted at the second candidate position 18b.

In some examples, the second candidate position 18b is considered if transmission fails at the first candidate position 18a.

Referring back to FIG. 2. If it is determined, for at least one candidate position 18 in the current radio frame 16, that one or more signals 20 are to be transmitted to the at least one user equipment 12, method 200 proceeds to block 204.

At block 204, method 200 comprises transmitting one or more signals 20 to the at least one user equipment 12 using the at least one candidate position 18 in the current radio frame 16.

In some examples, at block 204, method 200 can be considered to comprise transmitting one or more signals 20 from the apparatus 10 and/or gNB 120 to the at least one user equipment 12 using at least one candidate position 18 in the current radio frame 16.

Accordingly, FIG. 2 shows if it is determined, for at least one candidate position 18 in the current radio frame 16, that one or more signals 20 are to be transmitted to the at least one user equipment 12, transmitting one or more signals 20 to the at least one user equipment 12 using the at least one candidate position 18 in the current radio frame 16.

In some examples, method 200 proceeds to block 204 when a transmission success is determined at a candidate position 18 at block 202 and one or more signals 20 are transmitted at the determined candidate position 18.

In some examples, method 200 proceeds to block 204 when a plurality of candidate positions 18 have been considered at block 202 and at block 204 one or more signals 20 are transmitted at the candidate positions 18 determined to have associated successful transmission.

In some examples, method 200 can move back to block 202 after block 204 to allow the determination at block 202 to be performed after one or more signals 20 have been transmitted for a successful candidate position 18 of a current radio frame 16 at block 204.

For example, if a transmission success is determined at a first candidate position 18 of a current radio frame 16, one or more signals 20 can be transmitted to the at least one user equipment 12 at the first candidate position 18 before a second candidate position 18 of the current radio frame 16 is considered and so on.

In some examples, method 200 does not move back to block 202 for a current radio frame 16.

In some examples, transmitting one or more signals 20 to the at least one user equipment 12 can be performed in any suitable way using any suitable information.

For example, any suitable wireless and/or wired transmission can be used to transmit the one or more signals 20.

In some examples, the one or more signals 20 can comprise any suitable signals and/or messages.

In some examples, the one or more signals are dependent on the test being performed.

In some examples, transmitting one or more signals 20 comprises transmitting a synchronization signal block (SSB).

In some examples, method 200 comprises transmitting one or more further signals following transmission of the one or more signals 20.

For example, method 200 can comprise transmitting data following transmission of an SSB. See, for example, FIG. 11.

In some examples, method 200 comprises, if it is determined, for a candidate position 18 in the current radio frame 16, that one or more signals 20 are to be transmitted to the at least one user equipment 12, transmitting one or more further signals in a candidate position 18 of the current radio frame 16 subsequent to the candidate position 18 in which it is determined to transmit one or more signals 20.

For example, if an SSB having a first index is successfully transmitted at a first candidate position 18 the subsequent candidate position 18 is used for the next SSB index.

If it is determined, for at least one candidate position 18 in the current radio frame 16, that one or more signals 20 are not to be transmitted to the at least one user equipment 12, method 200 proceeds to block 206.

At block 206, method 200 comprises determining if a maximum number of transmission failures 22 has occurred. In some examples, a transmission failure 22 can be determined to have occurred when it is determined that no signals are transmitted or to be transmitted in a current radio frame 16.

Such a transmission failure 22, see for example FIG. 3B, can be considered a radio frame transmission failure 22. In some examples, a radio transmission failure 22 can be considered an unavailable sample.

Accordingly, FIG. 2 shows if it is determined, for at least one candidate position 18 in the current radio frame 16, that one or more signals 20 are not to be transmitted to the at least one user equipment 12, determining if a maximum number of transmission failures has occurred, wherein a transmission failure 22 is determined to have occurred when it is determined that no signals are transmitted or to be transmitted in a current radio frame 16.

In some examples, a transmission failure 22 can be determined to have occurred when it is determined that no signals are transmitted or to be transmitted in the candidate positions 18 of a radio frame 14.

For example, with reference to FIGS. 3A and 3B, a radio frame transmission failure 22 can be determined to have occurred for the illustrated radio frame 14 if transmission of one or more signals 20 is determined not to be transmitted in both the first and second candidate positions 18a, 18b.

Accordingly, in such examples, no signals would be transmitted in the illustrated radio frame 14 of FIG. 3A.

With reference to FIG. 2, in some examples, the determination at block 206 can be performed after a position transmission failure has been determined at any suitable number of candidate positions 18 in the current radio frame 16.

In some examples, the determination at block 206 can be performed if a position transmission failure is determined at the first candidate position 18 of the current radio frame 16 at block 202. See, for example, FIG. 5.

In some examples, the determination at block 206 can be performed if a position transmission failure is determined at the first candidate position 18 of the current radio frame 16 and any suitable number of subsequent candidate positions 18 of the current radio frame 16. See, for example, FIG. 9.

In some examples, the determination at block 206 can be performed if a radio frame transmission failure 22 is determined for the current radio frame 16.

In examples, determining if a maximum number of radio frame transmission failures 22 has occurred can be performed in any suitable way using any suitable method.

In some examples, determining if a maximum number of radio frame transmission failures 22 has occurred comprises determining if a maximum number of radio transmission failures 22 has occurred based, at least in part, on a number of consecutive radio frame transmission failures 22 and/or a number of radio frame transmission failures 22 within a window 26 of previous radio frames 14.

In some examples, determining if a maximum number of radio frame transmission failures 22 has occurred comprises determining if the number of consecutive radio frame transmission failures 22 has reached a threshold and/or determining if the number of radio frame transmission failures 22 within a window 26 of previous radio frames 14 has reached a threshold.

In some examples, determining if a maximum number of radio frame transmission failures 22 has occurred can be considered determining if a predetermined number of radio frame transmission failures 22 has occurred.

In some examples, a threshold can be considered a predetermined amount and/or value.

In some examples, the threshold value and/or predetermined amount and/or value can vary/change during a test and/or test case.

In some examples, determining if the number of consecutive radio frame transmission failures 22 has reached a threshold can be performed in any suitable way using any suitable method.

In some examples, a counter is incremented when a radio frame transmission failure 22 is determined to have consecutively occurred and the counter value compared with a threshold. The counter can be represented by $I_C$.

Any suitable threshold for consecutive radio frame transmission failures 22 can be used. For example a threshold in the range 3 to 7 can be used in relation to consecutive radio frame transmission failures 22.

In this way, the number of consecutive radio frame transmission failures can be limited by the threshold, which can be represented by $N_{UNAV}$.

In some examples, determining if the number of radio frame transmission failures 22 in a window 26 of previous radio frames 14 has reached a threshold can be performed in any suitable way using any suitable method.

In some examples, a count of the number of radio frame transmission failures 22 that have occurred within a window 26 of previous radio frames 14 is kept and the count compared with a threshold. The count can be represented by $I_w$.

Any suitable threshold for number of radio frame transmission failures 22 within a window 26 of previous radio frames 14 can be used. For example, a threshold in the range 5 to 9 can be used in relation to the number of radio frame transmission failures 22 within a window 26. In some examples, a threshold of 7 can be used in relation to the number of radio frame transmission failures 22 within a window 26.

In some examples, determining if a maximum number of radio frame transmission failures 22 has occurred comprises determining the number of radio frame transmission successes within a window 26 in addition to or instead of a number of radio frame transmission failures 22 within a window 26.

A radio frame transmission success can be referred to as a transmission success and can be considered a radio frame 14 in which one or more signals 20 are successfully transmitted. A radio frame transmission success can be considered an available sample.

For example, a count of radio frame transmission successes can be kept and compared to a threshold. See, for example, FIG. 6. The counter can be represented by $I_S$.

In this way the number of radio transmission failures within a window 26 can be limited by the threshold, which can be represented by $L_{MAX}$.

In some examples, the method 200 comprises recording and/or storing a transmission result 28 for the current frame 14.

A transmission result 28 can be considered an indication of whether and/or where one or more signals were transmitted in a radio frame 14.

In examples, transmission results 28 can be recorded and/or stored in any suitable way using any suitable method.

In some examples, recording and/or storing a transmission result 28 comprises recording and/or storing information in at least one memory, for example in at least one data structure.

In some examples, a vector quantity can be used to record/store transmissions results. For example, SSB[n] can be used to record/store transmission results, where n represents transmission result 28 for the nth radio frame 14 and has a value of '1' if one or more signals transmitted in a first candidate position 18, '2' of one or more signals transmitted in a second candidate position 18 and '0' if a radio frame transmission failure 22 occurred. Any suitable number of candidate positions 18 can be used.

However, in some examples, the transmission results 28 can be recorded and/or stored in any suitable way.

Reference is made to FIG. 3B.

In the example of FIG. 3B a transmission result 28 for the radio frames 14 is shown above the respective radio frames 14.

In the illustrated example, the transmission results are '1' for transmission in first candidate position, '2' for transmission in second candidate position or '0' for radio frame transmission failure 22. In the example of FIG. 3 transmission in first and second candidate positions 18 is mutually exclusive.

Also illustrated in the example of FIG. 3B is a window 26 of previous radio frames, which is located to the left of the indicated current radio frame 16.

In the example of FIG. 3 the window 26 encompasses and/or covers and/or includes 5 previous radio frames 14.

In the illustrated example, the transmission results 28 for the radio frames 14 in the window 26 are '2', '0', '0', '0', '0'. Accordingly, the transmission results 28 in the window 26 in FIG. 3 are transmission of one or more signals 20 in the second candidate position followed by four radio frame transmission failures 22.

Accordingly, in the example of FIG. 3 there are four consecutive radio frame transmission failures 22 and also four radio frame transmission failures 22 within the window 26.

Referring back to FIG. 2.

In examples, determining if a maximum number of transmission failures has occurred comprises analysing the transmission results 28 for the radio frames 14 in the window 26.

Accordingly, in some examples, FIG. 2 illustrates a method 200 comprising recording a transmission result 28 for the current frame 16, wherein determining if a maximum number of transmission failures has occurred comprises analysing the transmission results 28 for the radio frames 14 in the window 26.

In examples, the size of the window 26 of previous frames is fixed or variable.

Accordingly, in examples the number of previous transmission results 28 considered in a window 26 can be fixed for a test case or can be varied during a test case.

In examples, the size of the window 26 can be determined in any suitable way using any suitable method.

In some examples, the size of the window 26 is determined based, at least in part, on at least one radio resource management requirement and/or one or more requirements under test.

In another implementation option, the window, X, may be adjusted to follow the RLM core requirements as $$\mathrm{Max}(100,\mathrm{Ceil}((5+L_{in})*P)*T_{SSB}),$$

Where: $L_{in}$ is the number of radio frame transmission failures 22 in the window 26, or $I_w$ and $T_{SSB}$ is the time between SSB bursts.

which for P=1 (which is seen as common case), and $T_{SSB}$=20 ms can be interpreted as a window of $5+I_W$ consecutive frames. See, for example, FIG. 6.

In examples, the method can be modified in order to enable simpler checking of the counters. Since core requirements can mean the analysed variable window length must contain 5 valid SSBs when the parameters above are considered, analysing the number of failed LBT samples within $5+I_W$ as $I_W < L_{MAX}$ is equivalent to analysing the number of successful LBT samples $I_S$ within a fixed window X=5+ $L_{MAX}$ as $I_S \geq S_{MIN}$. See, for example, FIG. 7

If it is determined that a maximum number of radio frame transmission failures has occurred, method 200 proceeds to block 208.

At block 208, method 200 comprises transmitting one or more signals 20 to the at least one user equipment 12 using at least one candidate position 18 in the current frame 14.

Accordingly, in some examples, the method 200 comprises if it is determined that a maximum number of transmission failures 22 has occurred, transmitting one or more signals to the at least one user equipment 12 using at least one candidate position 18 in the current radio frame 14.

At block 208, one or more signals 20 are transmitted in the current radio frame 14 to prevent a further radio frame transmission failure 22 from occurring and/or to limit the number of radio frame transmission failures 22.

In some examples, transmitting one or more signals 20 to the at least one user equipment 12 can be performed in any suitable way using any suitable information.

For example, any suitable wireless and/or wired transmission can be used to transmit the one or more signals 20.

In some examples, the one or more signals can comprise any suitable signals and/or messages.

In some examples, the one or more signals are dependent on the test being performed.

In some examples, transmitting one or more signals 20 comprises transmitting a synchronization signal block (SSB).

In examples, at block 208, one or more signals 20 can be transmitted using any candidate position 18 in the current radio frame 16.

In some examples, transmitting one or more signals 20 using at least one candidate position 18 in the current radio frame 14 if it is determined that a maximum number of transmission failures has occurred, comprises transmitting one or more signals 20 in the last candidate position 18 in the current radio frame 14.

In some examples, if it is determined at block 206 that a maximum number of radio frame transmission failures 22 has not occurred, method 200 can move back to block 202 to consider one or more further candidate positions 18 of the current radio frame 16.

In some examples, if it determined at block 206 that a maximum number of radio frame transmission failures 22 has not occurred, a radio frame transmission failure 22 is determined for the current radio frame 16 and, for example, a '0' is recorded and/or stored in relation to the current radio frame 16.

In some examples, after blocks 202, 204, 206 and/or 208 have been resolved for a current radio frame 16, method 200 can proceed to block 210.

At block 210, the method 200 comprises determining if the behavior of the terminal node 110, which can be a UE 12, is consistent with one or more requirements, such as one or more RRM requirements and/or one or more requirements under test.

In some examples, determining if the behavior of the terminal node 110 is consistent with one or more requirements can be performed in any suitable way using any suitable method.

For example, one or more signals 20 can be transmitted between the terminal node 110, 12 and the test equipment 10.

In some examples, one or more signals 20 are transmitted by the terminal node 110 to the test equipment 10 and used by the test equipment in the determination.

In some examples, after block 210, the method 200 can proceed back to block 202 for the next radio frame 14, which becomes the current radio frame 16. This can continue until testing and/or a test case ends.

In some examples, testing and/or a test case can end based, at least in part, on any suitable criterion or criteria.

For example, testing and/or a test case can end based, at least in part, on a number of frames considered and/or an elapsed amount of time.

In some examples, when testing and/or a test case has ended, the method 200 proceeds to block 212.

At block 212, the method 200 comprises providing test results for the testing and/or test case.

In some examples, test results can be provided in any suitable way using any suitable method. For example, test results can be transmitted and/or output in any suitable way.

Some examples are valid for one set of one or more signals 20/SSB index and two candidate positions.

Some examples are valid for 2 sets of one or more signals 20/SSB indexes and two SSB candidate positions with two sets of signal(s) 20/SSBs transmitted.

In the latter case, it can be assumed that once a first candidate position for the first SSB index is not used due to position transmission failure, the first candidate position 18 of the second SSB index is not used either.

In some examples, method 200 can be performed in 'real-time' and the one or more signals 20 transmitted or not transmitted as the determinations are made for a current radio frame 16.

In some examples, method 200 can be performed for a number of radio frames 14 for a test case ahead of interaction with the UE terminal node 110 such that a schedule of transmission or not transmission of one or more signals 20 for the radio frames 14 of the test case is determined before interaction with the UE 12.

Examples of the disclosure provide technical benefits. For example, examples of the disclosure provide for testing of a terminal node, such as a UE, while preventing test results being invalidated.

Examples of the disclosure control and/or limit a number of simulated and/or emulated transmission failures during testing to prevent an invalid number of radio frame transmission failures from occurring and invalidating test results.

Examples of the disclosure provide for avoidance of a combination of position transmission failures, such as LBT failures, for which the requirements are not clearly specified for conformance testing.

Figure 4:
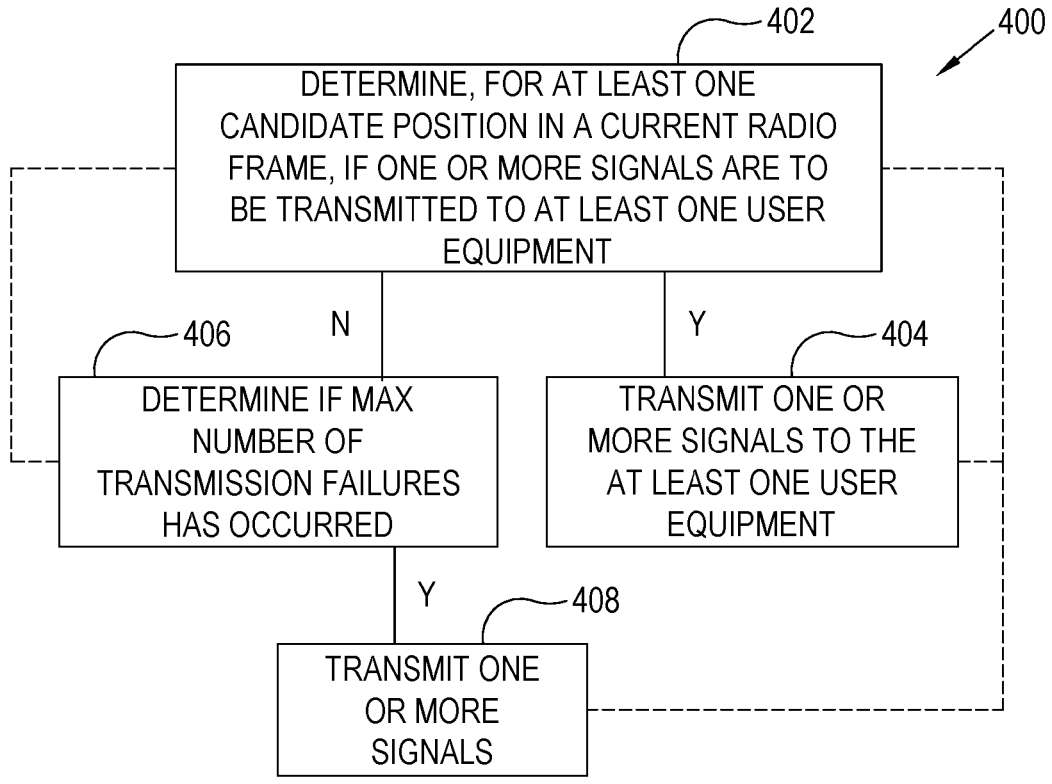
FIG. 4 shows another example of the subject matter described herein.

FIG. 4 illustrates an example of a method 400.

In some examples, the method 400 can be performed by any suitable apparatus comprising any suitable means for performing the method 400.

In some examples, the method 400 can be performed by an apparatus 10, which can be considered test equipment.

Method 400 comprises enabling testing of at least one user equipment 12 over a plurality of radio frames 14 by performing, at least, the method 400 illustrated in the example of FIG. 4.

At block 402, the method 400 comprises determining, for at least one candidate position 18 in a current radio frame 16, if one or more signals 20 are to be transmitted to the at least one user equipment 12, based, at least in part, on one or more probabilities associated with the at least one candidate position 18 in the current radio frame 16.

If it is determined, for at least one candidate position 18 in the current radio frame 16, that one or more signals 20 are to be transmitted to the at least one user equipment 12, method 400 proceeds to block 404.

At block 404, the method 400 comprises transmitting one or more signals 20 to the at least one user equipment 12 using the at least one candidate position 18 in the current radio frame 16.

In some examples, the method 400 can proceed back to block 402 from block 404 as indicated by the dashed linking block 404 and block 402. In some examples, a new radio frame 14 can be considered at block 402 or one or more further candidate positions 18 of a current radio frame 16 can be considered at block 402.

If, at block 402, it is determined, for at least one candidate position 18 in the current radio frame 16, that one or more signals 20 are not to be transmitted to the at least one user equipment 12, method 400 proceeds to block 406.

At block 406, method 400 comprises determining if a maximum number of transmission failures 22 has occurred, wherein a transmission failure 22 is determined to have occurred when it is determined that no signals are transmitted or to be transmitted in a current radio frame 16.

If it is determined that a maximum number of transmission failures 22 has occurred, method 400 proceeds to block 408.

At block 408, method 400 comprises transmitting one or more signals 20 to the at least one user equipment 12 using at least one candidate position 18 in the current radio frame 16.

After block 408, method 400 returns to block 402 and a new radio frame 14 is considered as the current radio frame 16.

In some examples, if it is determined at block 406, that a maximum number of transmission failures 22 has not occurred, the method 400 can proceed back to block 402.

Method 400 can end when a predetermined number of radio frames 14 have been considered and/or when a predetermined time has elapsed.

Figure 5:
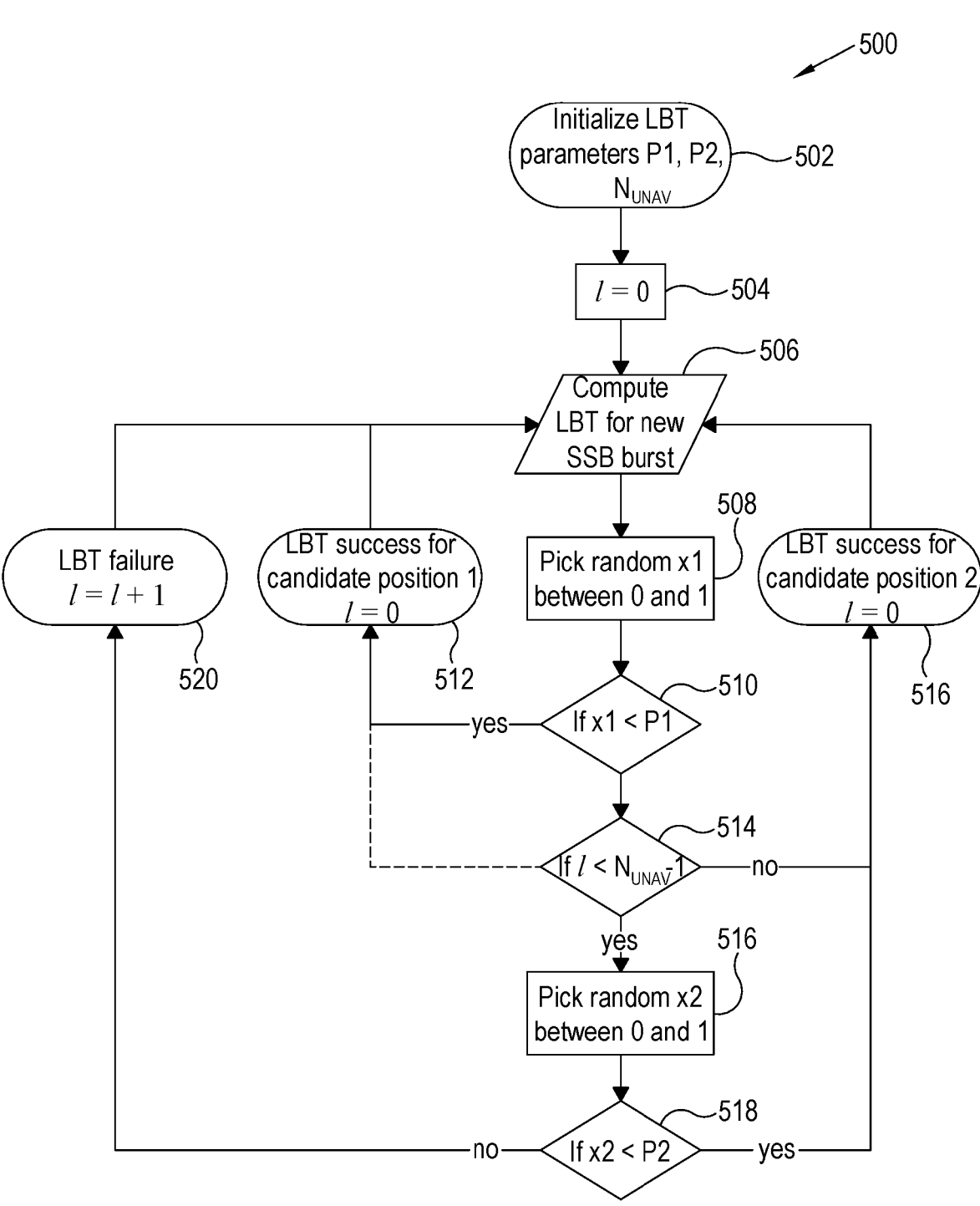
FIG. 5 shows another example of the subject matter described herein.

FIG. 5 illustrates an example of a method 500.

In some examples, the method 500 can be performed by any suitable apparatus comprising any suitable means for performing the method 500.

In some examples, the method 500 can be performed by an apparatus 10, which can be considered a test equipment.

In the example of FIG. 5, LBT transmission failures are simulated and/or emulated. In the example of FIG. 5 the number of consecutive radio frame transmission failures 22 is limited/controlled.

At block 502, parameters for method 500 are initialized, including P1, P2 and $N_{UNAV}$.

At block 504, a counter, I, is initialized at zero. In the example of FIG. 5, I is a counter of the number of consecutive radio frame transmission failures 22. In some examples counter I can be considered $I_C$.

As indicated at block 506, the method 500 comprises computing LBT for an SSB burst. In some examples, this can be considered computing LBT for a current radio frame 16.

At block 508, a random number x1 between 0 and 1 is determined.

If, at block 510, x1<P1, the method 500 proceeds to block 512 and LBT success for candidate position 1 is determined. The counter I is set to zero.

If, at block 510, x1 is not <P1, the method 500 proceeds to block 514.

At block 514, the method 500 checks the number of consecutive radio frame transmission failures 22.

In the example of FIG. 5, at block 514, it is determined if I<$N_{UNAV}$−1.

If block 514 is determined to be false, it is determined that a predetermined amount of consecutive radio frame transmission failures 22 has occurred and the method 500 proceeds to block 516.

At block 516 LBT success for candidate position 2 is determined and counter I is set to zero.

In some examples, if block 514 is determined to be false, the method 500 can proceed to block 512 as indicated by the dashed line. In such examples, following block 516, LBT success for candidate position 1 is determined instead of LBT success for candidate position 2.

If block 514 is determined to be true, the method 500 proceeds to block 516.

At block 516 a random number x2 between 0 and 1 is determined.

At block 518 it is determined if x2<P2.

If block 518 is determined to be true, the method 500 proceeds to block 516 and LBT success at candidate position 2 is determined and counter I is set to zero.

If block 518 is determined to be false, the method 500 proceeds to block 520, LBT failure is determined for the current radio frame/SSB burst and the counter I is increased by one.

Figure 6:
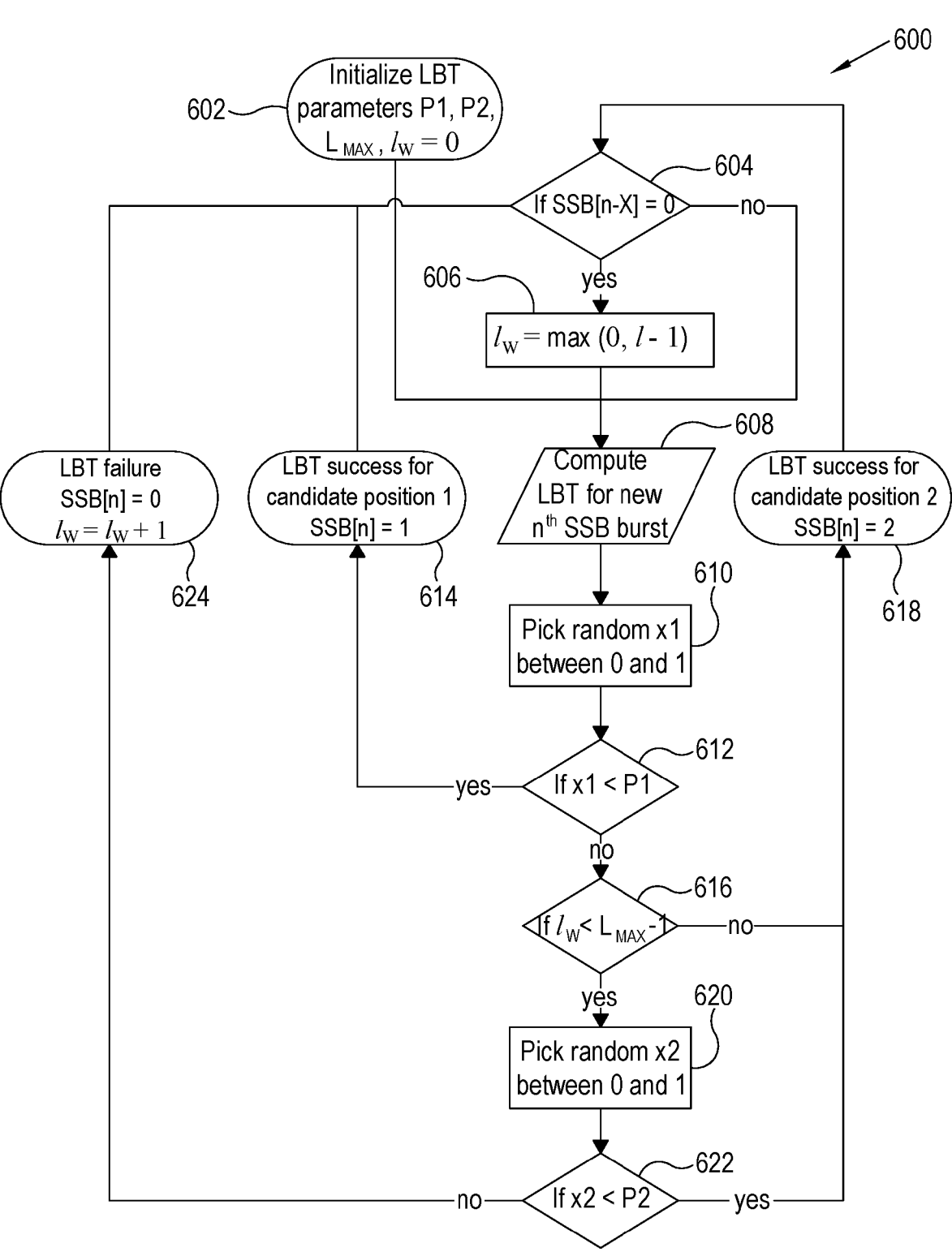
FIG. 6 shows another example of the subject matter described herein.

FIG. 6 illustrates an example of a method 600.

In some examples, the method 600 can be performed by any suitable apparatus comprising any suitable means for performing the method 600.

In some examples, the method 600 can be performed by an apparatus 10, which can be considered test equipment.

In the example of FIG. 6, LBT transmission failures are simulated and/or emulated. In the example of FIG. 6 the number of radio frame transmission failures in a window 26 of size X is limited/controlled.

At block 602, the parameters for method 600 are initialized, including P1, P2, and $L_{MAX}$. A counter, $I_w$, of the number of radio frame transmission failures in the window 26 is initialized at zero.

After initialization, the method 600 proceeds to block 608. As indicated at block 608, the method 600 comprises computing LBT for nth SSB burst. In some examples, this can be considered computing LBT for a current nth radio frame 16.

At block 610 a random number x1 between 0 and 1 is determined.

At block 612 it is determined if x1<P1.

If block 612 is determined to be true, the method 600 proceeds to block 614 and LBT success at candidate position 1 is determined. The transmission result is recorded in SSB[n].

If block 612 is determined to be false, the method 600 proceeds to block 616.

At block 616 the method 600 checks the number of radio frame transmission failures within window 26. At block 616 it is determined if $I_w$<$L_{MAX}$−1.

If block 616 is determined to be false, it is determined that a predetermined amount of radio transmission failures 22 in the window 26 has been reached and the method 600 proceeds to block 618.

At block 618, LBT success for candidate position 2 is determined. The transmission result is recorded in SSB[n].

In some examples, if block 616 is determined to be false, the method 600 can proceed to block 614.

If block 616 is determined to be true, the method 600 proceeds to block 620.

At block 620 a random number x2 between 0 and 1 is determined.

At block 622 it is determined if x2<P2.

If block 622 is determined to be true, the method 600 proceeds to block 618 and LBT success at candidate position 2 is determined. The transmission result is recorded in SSB[n].

If block 622 is determined to be false, the method 600 proceeds to block 624 and LBT failure is determined for the current radio frame/SSB burst. The transmission result is recorded in SSB[n] and Counter Iw is increased by one and the method 600 proceeds to block 604.

At block 604, it is determined if SSB[n−X]=0.

If block 604 is determined to be false, it is determined that a recorded transmission failure is not moving out of the window 26 and method 600 proceeds to block 608.

If block 604 is determined to be true, it is determined that a recorded transmission failure is moving out of the window 26 and, at block 606, counter $I_w$ is reduced by one, but goes no lower than zero.

The method 600 then proceeds to block 608 for a new current radio frame 16/SSB burst.

Figure 7:
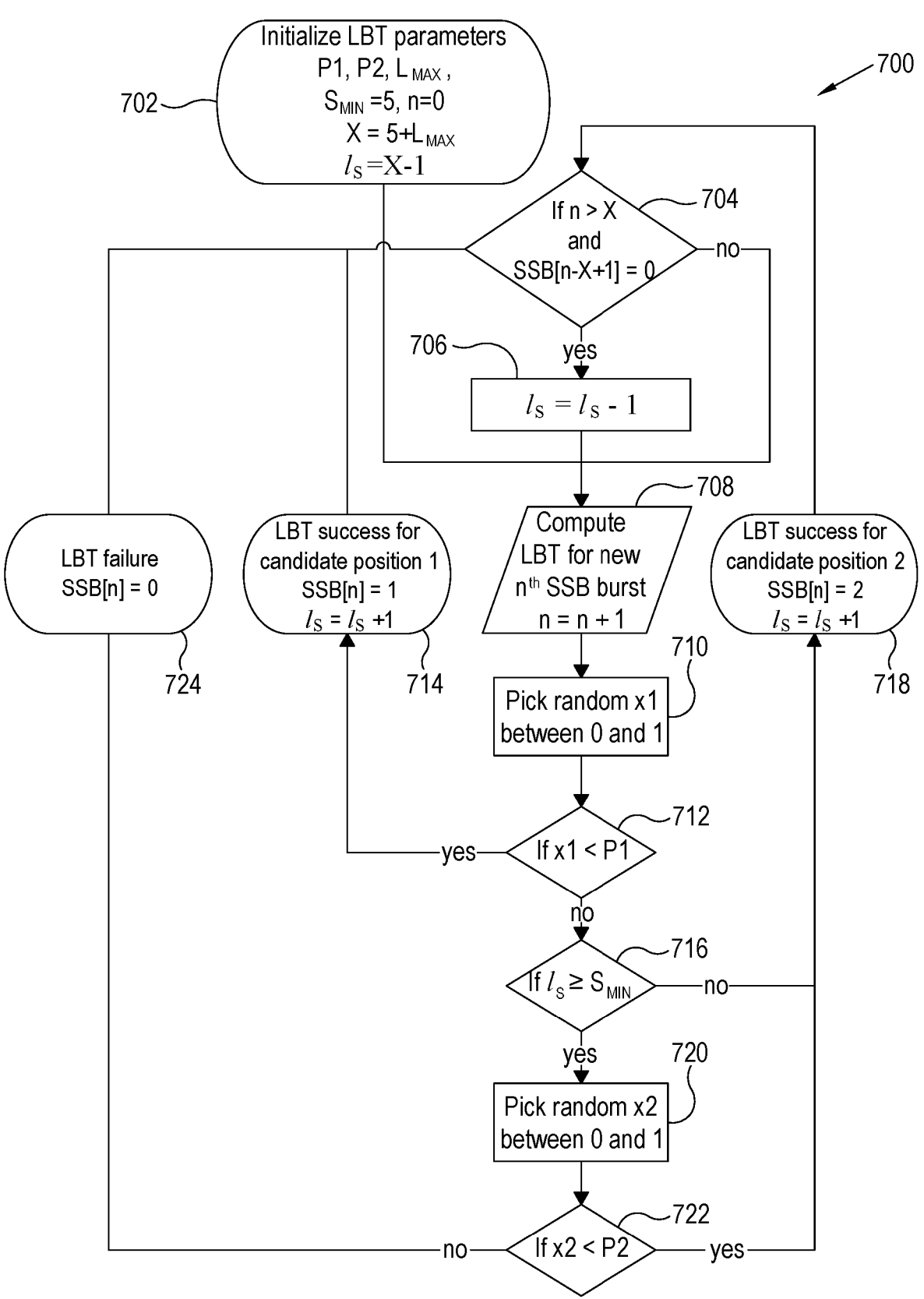
FIG. 7 shows another example of the subject matter described herein.

FIG. 7 illustrates an example of a method 700.

In some examples, the method 700 can be performed by any suitable apparatus comprising any suitable means for performing the method 700.

In some examples, the method 700 can be performed by an apparatus 10, which can be considered a test equipment.

In the example of FIG. 7, LBT transmission failures are simulated and/or emulated. In the example of FIG. 7 the number of radio frame transmission successes in a window 26 of size X is limited/controlled.

At block 702, the parameters for method 700 are initialized, including P1, P2, $L_{MAX}$, $S_{MIN}$, n and X. A counter, $I_S$, of the number of radio frame successes in the window 26 is initialized at X−1.

After initialization, method 700 proceeds to block 708. As indicated at block 708, the method 700 comprises computing LBT for nth SSB burst. In some examples, this can be considered computing LBT for a current nth radio frame 16.

At block 708, n is increased by one.

At block 710 a random number x1 between 0 and 1 is determined.

At block 712 it is determined if x1<P1.

If block 712 is determined to be true, the method 700 proceeds to block 714 and LBT success at candidate position 1 is determined. The transmission result is recorded in SSB[n] and the counter $I_S$ is increased by one and the method 700 proceeds to block 704.

If block 712 is determined to be false, the method 700 proceeds to block 716.

At block 716 the method 700 checks the number of radio frame transmission successes within the window 26. At block 716 it is determined if $I_S \geq S_{MIN}$.

If block 716 is determined to be false, it is determined that a predetermined amount of radio transmission successes in the window 26 has been reached and the method 700 proceeds to block 718.

At block 718, LBT success for candidate position 2 is determined. The transmission result is recorded in SSB[n] and the counter $I_S$ is increased by one.

In some examples, if block 716 is determined to be false, method 600 can proceed to block 714 where success for candidate position 1 is determined instead of at candidate position 2.

If block 716 is determined to be true, method 700 proceeds to block 720.

At block 720 a random number x2 between 0 and 1 is determined.

At block 722 it is determined if x2<P2.

If block 722 is determined to be true, the method 700 proceeds to block 718 and LBT success at candidate position 2 is determined. The transmission result is recorded in SSB[n] and the counter $I_S$ is increased by one.

If block 722 is determined to be false, method 700 proceeds to block 724 and LBT failure is determined for the current radio frame/SSB burst. The transmission result is recorded in SSB[n] and the method 700 proceeds to block 704.

At block 704, it is determined if n>X and SSB[n−X+1]=0.

If block 704 is determined to be false, the method 700 proceeds to block 708.

If block 704 is determined to be true, the counter $I_S$ is reduced by one and the method 700 proceeds to block 708 for a new current radio frame 16/SSB burst.

Figure 8:
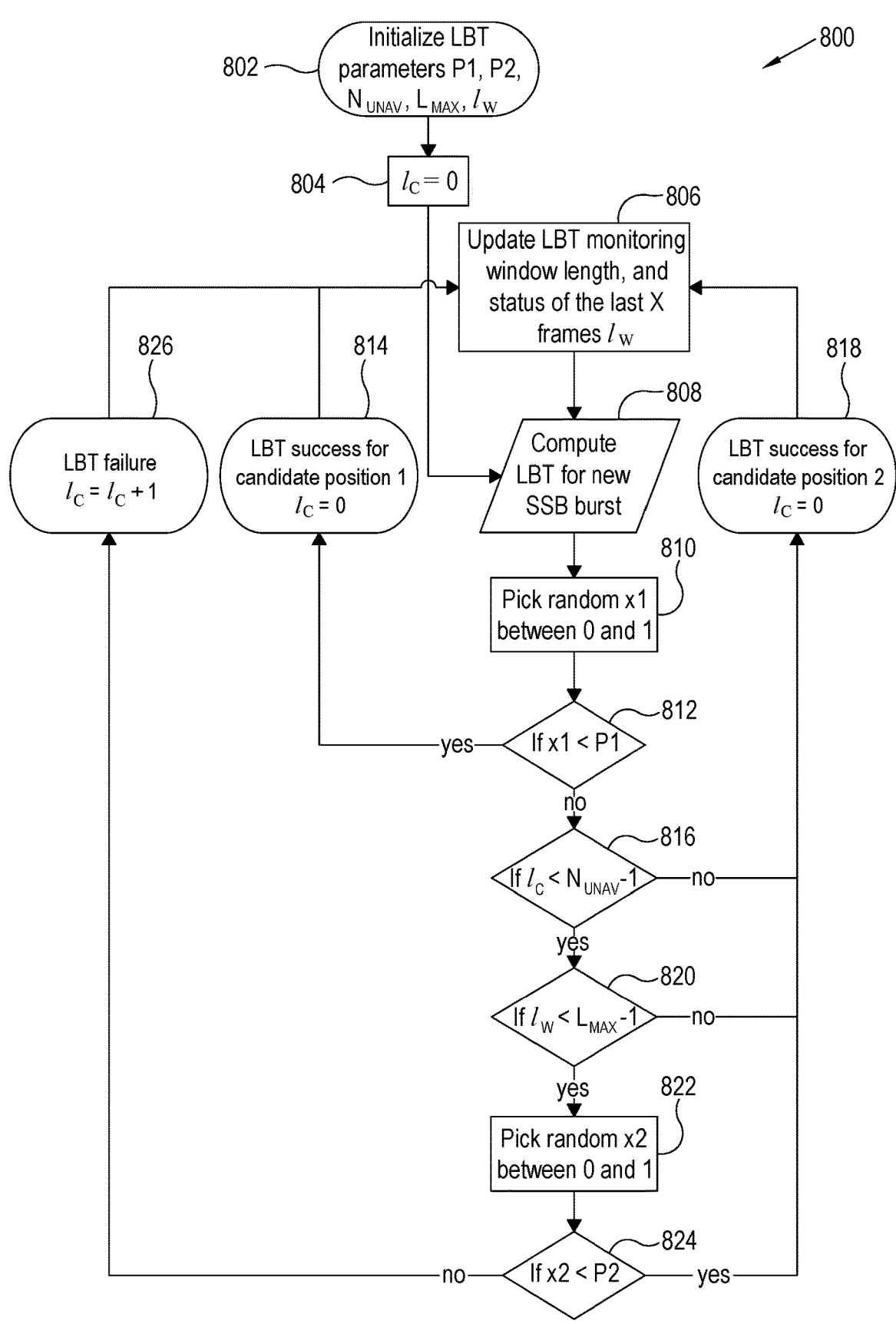
FIG. 8 shows another example of the subject matter described herein.

FIG. 8 illustrates an example of a method 800.

In some examples, the method 800 can be performed by any suitable apparatus comprising any suitable means for performing the method 800.

In some examples, the method 800 can be performed by an apparatus 10, which can be considered a test equipment.

In the example of FIG. 8, LBT transmission failure is simulated and/or emulated. In the example of FIG. 8 the number of radio frame transmission failures in a window 26 of size X is limited/controlled and the number of consecutive radio frame transmission failures is controlled.

At block 802, the parameters for method 800 are initialized, including P1, P2, $N_{UNAV}$, $L_{MAX}$, and a counter $I_w$. A counter, $I_C$, of the number of consecutive radio frame failures is initialized at zero.

After initialization, method 800 proceeds to block 808. As indicated at block 808, the method 800 comprises computing LBT for nth SSB burst. In some examples, this can be considered computing LBT for a current nth radio frame 16.

At block 810 a random number x1 between 0 and 1 is determined.

At block 812 it is determined if x1<P1.

If block 812 is determined to be true, the method 800 proceeds to block 814 and LBT success at candidate position 1 is determined. The counter $I_C$ is set to zero and the method 800 proceeds to block 806.

If block 812 is determined to be false, the method 800 proceeds to block 816.

At block 816, the method 800 checks the number of consecutive radio frame transmission failures 22.

In the example of FIG. 8, at block 816, it is determined if $I_C < N_{UNAV} - 1$.

If block 816 is determined to be false, it is determined that a predetermined amount of consecutive radio frame transmission failures 22 has occurred and the method 800 proceeds to block 818.

At block 818 LBT success for candidate position 2 is determined and the counter $I_C$ is set to zero.

In some examples, if block 816 is determined to be false, the method 800 can proceed to block 814 where success for candidate position 1 is determined instead of candidate position 2.

If block 816 is determined to be true, the method 800 proceeds to block 820.

At block 820 method 800 checks the number of radio frame transmission failures 22 within the window 26. At block 820 it is determined if $I_w < L_{MAX} - 1$.

If block 820 is determined to be false, it is determined that a predetermined amount of radio transmission failures 22 in the window 26 has been reached and the method 800 proceeds to block 818.

In some examples, if block 820 is determined to be false, method 800 can proceed to block 814 where success for candidate position 1 is determined instead of candidate position 2.

If block 820 is determined to be true, method 800 proceeds to block 822.

At block 822 a random number x2 between 0 and 1 is determined.

At block 824 it is determined if x2<P2.

If block 824 is determined to be true, the method 800 proceeds to block 818.

If block 824 is determined to be false, the method 800 proceeds to block 826 and LBT failure is determined for the current radio frame/SSB burst. The counter $I_C$ is increased by one, and the method 800 proceeds to block 806.

At block 806, length of window X is updated. The counter $I_w$ is also updated for frames in new window of updated length.

The method 800 proceeds to block 808 for a new current radio frame 16/SSB burst.

In some examples, two or more transmissions of one or more signals 20 can be considered for a current radio frame 16. For example, two or more SSB indexes in an SSB burst and transmission failure/success can be considered independently for the separate transmissions/SSB indexes. See, for example, FIGS. 9 and 10.

In such examples, it can be assumed that once one or more signals 20/SSB index is transmitted in a candidate position after position transmission success, the subsequent candidate position is used for the next transmission of one or more signals 20/SSB index.

Figure 9:
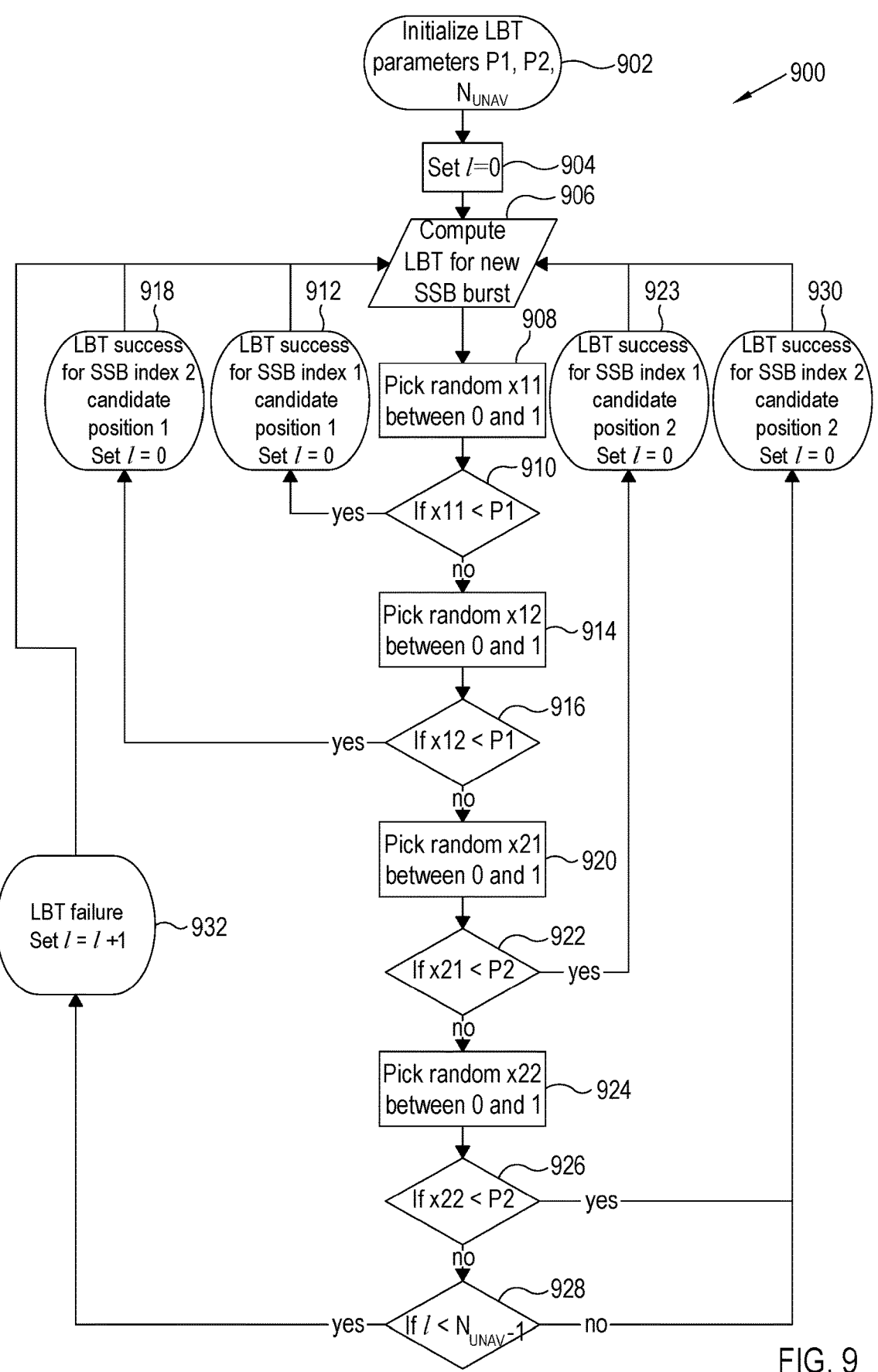
FIG. 9 shows another example of the subject matter described herein.

In the example of FIG. 9 $N_{UNAV}$ limits the radio frames containing no transmission of one or more signals 20/SSB indexes.

Figure 10:
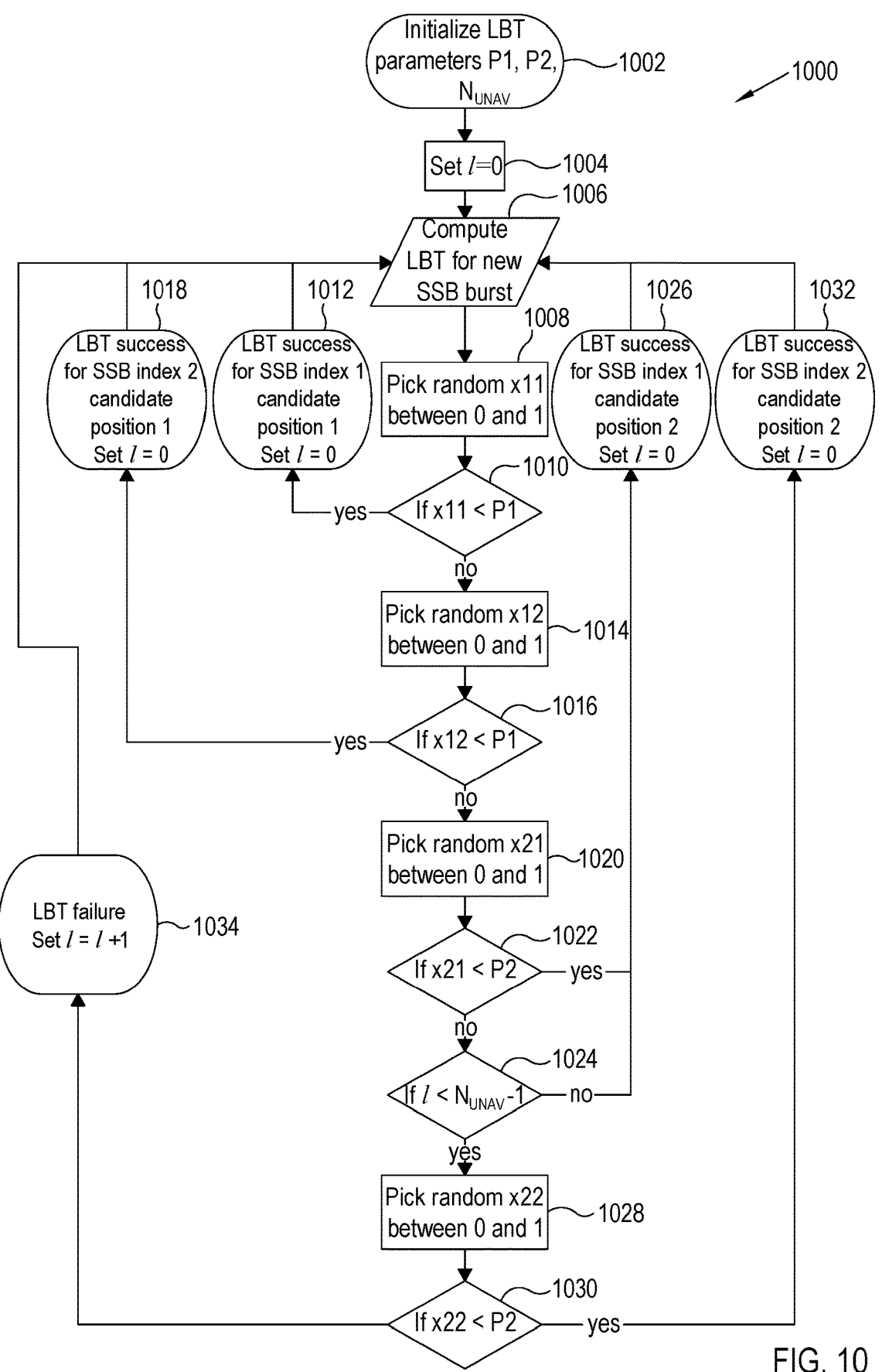
FIG. 10 shows another example of the subject matter described herein.

In the example of FIG. 10 $N_{UNAV}$ limits the number of radio frame transmission failures 22 considering both transmissions of one or more signals 20/SSB indexes.

FIG. 9 illustrates an example of a method 900.

In some examples, the method 900 can be performed by any suitable apparatus comprising any suitable means for performing the method 900.

In some examples, the method 900 can be performed by an apparatus 10, which can be considered a test equipment.

In the example of FIG. 9, LBT transmission failures are simulated and/or emulated. In the example of FIG. 9 the number of consecutive radio frame transmission failures is controlled.

At block 902, the parameters for method 900 are initialized, including P1, P2, and $N_{UNAV}$.

At block 904, a counter, I, of the number of consecutive radio frame failures is initialized at zero.

After initialization, the method 900 proceeds to block 906. As indicated at block 906, the method 900 comprises computing LBT for new SSB burst. In some examples, this can be considered computing LBT for a new current radio frame 16.

At block 908 a random number x11 between 0 and 1 is determined.

At block 910 it is determined if x11<P1.

If block 910 is determined to be true, the method 900 proceeds to block 912 and LBT success for SSB index 1 at candidate position 1 is determined. The counter I is set to zero.

If block 910 is determined to be false, the method 900 proceeds to block 914.

At block 914 a random number x12 between 0 and 1 is determined.

At block 916 it is determined if x12<P1.

If block 916 is determined to be true, method 900 proceeds to block 918 and LBT success for SSB index 2 at candidate position 1 is determined. The counter I is set to zero, and the method 900 proceeds to block 906.

If block 916 is determined to be false, the method 900 proceeds to block 920.

At block 920 a random number x21 between 0 and 1 is determined.

At block 922 it is determined if x21<P2.

If block 922 is determined to be true, the method 900 proceeds to block 923 and LBT success for SSB index 1 at candidate position 2 is determined. Counter I is set to zero, and the method 900 proceeds to block 906.

If block 922 is determined to be false, the method 900 proceeds to block 924.

At block 924 a random number x22 between 0 and 1 is determined.

At block 926 it is determined if x22<P2.

If block 926 is determined to be true, the method 900 proceeds to block 930 and LBT success for SSB index 2 at candidate position 2 is determined. The counter I is set to zero, and the method 900 proceeds to block 906.

If block 926 is determined to be false, the method 900 proceeds to block 928.

At block 928, the method 900 checks the number of consecutive radio frame transmission failures 22.

In the example of FIG. 9, at block 928, it is determined if $I < N_{UNAV} - 1$.

If block 928 is determined to be false, in the method 900 it is determined that a predetermined amount of consecutive radio frame transmission failures 22 has occurred and method 900 proceeds to block 930.

In some examples, if block 928 is determined to be false, method 900 can proceed to any of blocks 918, 912, 923 and 930 and success can therefore be determined at any SSB index and/or candidate position.

If block 928 is determined to be true, method 900 proceeds to block 932 and LBT failure is determined for the current radio frame/SSB bursts. Counter I is increased by one, and the method 900 proceeds to block 906.

The method 900 proceeds to block 906 for a new current radio frame 16/SSB bursts.

FIG. 10 illustrates an example of a method 1000.

In some examples, the method 1000 can be performed by any suitable apparatus comprising any suitable means for performing the method 1000.

In some examples, the method 1000 can be performed by an apparatus 10, which can be considered a test equipment.

In the example of FIG. 10, LBT transmission failures are simulated and/or emulated. In the example of FIG. 10 the number of consecutive radio frame transmission failures is controlled.

At block 1002, the parameters for method 1000 are initialized, including P1, P2, and $N_{UNAV}$.

At block 1004, a counter, I, of the number of consecutive radio frame failures is initialized at zero.

After initialization, the method 1000 proceeds to block 1006. As indicated at block 1006, method 1000 comprises computing LBT for new SSB burst. In some examples, this can be considered computing LBT for a new current radio frame 16.

At block 1008 a random number x11 between 0 and 1 is determined.

At block 1010 it is determined if x11<P1.

If block 1010 is determined to be true, the method 1000 proceeds to block 1012 and LBT success for SSB index 1 at candidate position 1 is determined. The counter I is set to zero, and the method 1000 proceeds to block 1006.

If block 1010 is determined to be false, the method 1000 proceeds to block 1014.

At block 1014 a random number x12 between 0 and 1 is determined.

At block 1016 it is determined if x12<P1.

If block 1016 is determined to be true, the method 1000 proceeds to block 1018 and LBT success for SSB index 2 at candidate position 1 is determined. The counter I is set to zero, and the method 1000 proceeds to block 1006.

If block 1016 is determined to be false, the method 1000 proceeds to block 1020.

At block 1020 a random number x21 between 0 and 1 is determined.

At block 1022 it is determined if x21<P2.

If block 1022 is determined to be true, the method 1000 proceeds to block 1026 and LBT success for SSB index 1 at candidate position 2 is determined. The counter I is set to zero, and the method 1000 proceeds to block 1006.

If block 1022 is determined to be false, method 1000 proceeds to block 1024.

At block 1024, the method 1000 checks the number of consecutive radio frame transmission failures 22.

In the example of FIG. 10, at block 1024, it is determined if $I<N_{UNAV}-1$.

If block 1024 is determined to be false, in the method 1000 it is determined that a predetermined amount of consecutive radio frame transmission failures 22 has occurred and the method 1000 proceeds to block 1026, following which the method 1000 proceeds to block 1006.

In some examples, if block 1024 is determined to be false, method 1000 can proceed to any of blocks 1018, 1012, 1026 and 1032 and success can therefore be determined at any SSB index and/or candidate position. The method 1000 then proceeds to block 1006.

If block 1024 is determined to be true, the method 1000 proceeds to block 1028.

At block 1028 a random number x22 between 0 and 1 is determined.

At block 1030 it is determined if x22<P2.

If block 1030 is determined to be true, the method 1000 proceeds to block 1032 and LBT success for SSB index 2 at candidate position 2 is determined. The counter I is set to zero, and the method 1000 proceeds to block 1006.

If block 1030 is determined to be false, the method 1000 proceeds to block 1034 and LBT failure is determined for the current radio frame/SSB bursts. The counter I is increased by one, and the method 1000 proceeds to block 1006.

Method 1000 proceeds to block 1006 for a new current radio frame 16/SSB bursts.

Figure 11:
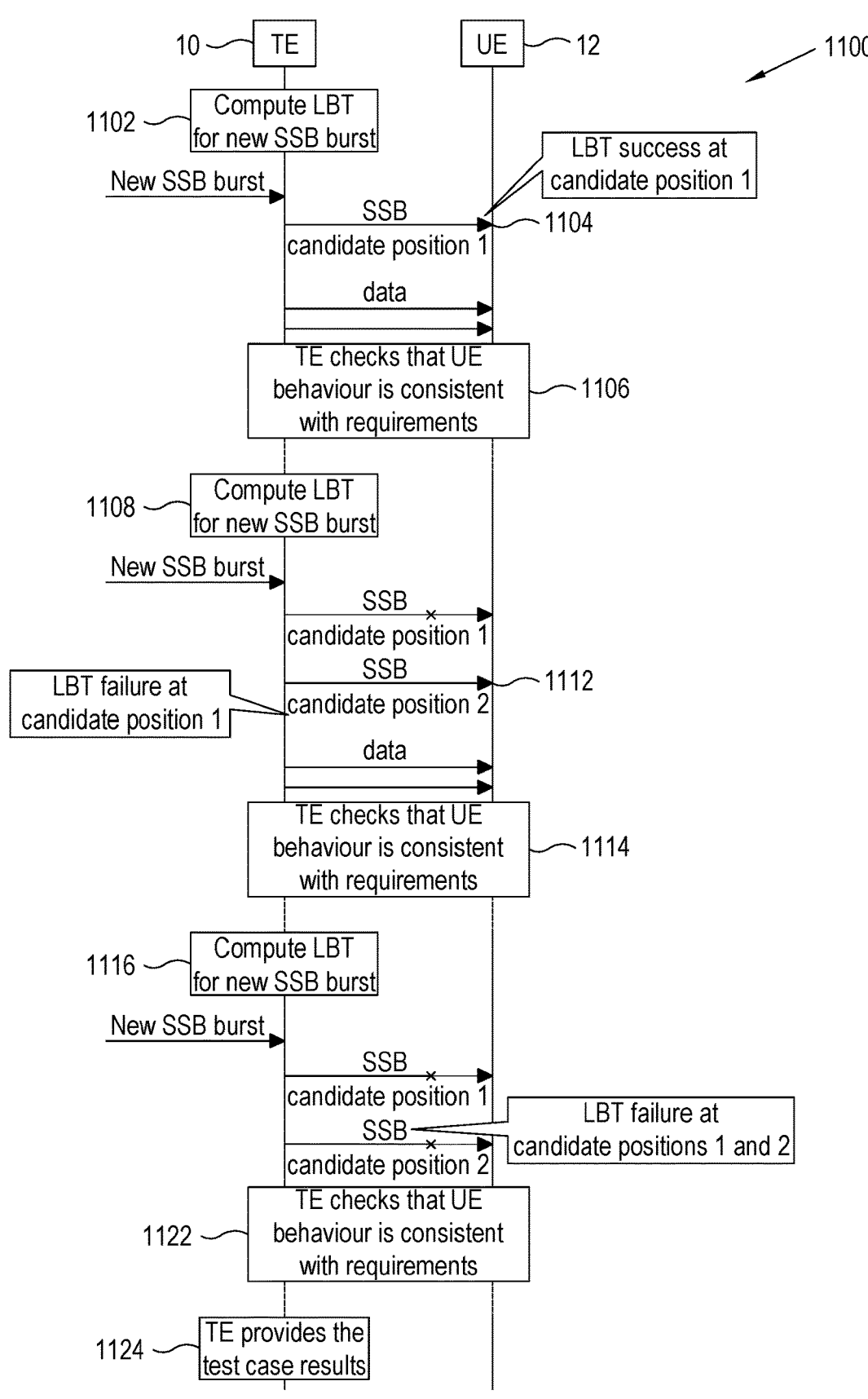
FIG. 11 shows another example of the subject matter described herein.

FIG. 11 illustrates an example of a method 1100.

In the example of FIG. 11 the method 1100 is performed by a test equipment 10 and UE 12.

At block 1102, test equipment computes LBT for a new SSB burst.

At block 1102, LBT success is determined at candidate position 1 and therefore, at block 1104, an SSB is transmitted from the test equipment 10 to the UE 12 at candidate position 1.

In the example of FIG. 11, data is transmitted from the test equipment 10 to the UE 12 following successful transmission of the SSB.

At block 1106, the test equipment 10 checks that UE behaviour is consistent with requirements.

At block 1108, the test equipment computes LBT for a new SSB burst.

At block 1108, LBT failure is determined at candidate position 1 and LBT success is determined at candidate position 2.

Therefore, at block 1112, an SSB is transmitted from the test equipment 10 to the UE 12 at candidate position 2.

In the example of FIG. 11, data is transmitted from the test equipment 10 to the UE 12 following successful transmission of the SSB.

At block 1114, the test equipment 10 checks that UE behaviour is consistent with requirements.

At block 1116, test equipment 10 computes LBT for a new SSB burst.

At block 1116, LBT failure is determined for both candidate positions and therefore a radio frame transmission failure 22 is determined. Accordingly, no SSB or data is transferred for the SSB burst determined at block 1116.

However, if it was determined at block 1116 that a predetermined amount of radio frame transmission failures had been reached, an SSB would be transmitted in the first or second candidate positions 18.

At block 1122, the test equipment 10 checks that UE behaviour is consistent with requirement.

At block 1124, it is determined that the test case has ended and the test equipment 10 provides the test case results.

Examples of the disclosure provide technical benefits. For example, examples of the disclosure provide for testing one or more UE behaviours with simulated/emulated transmission failure, such as LBT failure, while controlling an amount of transmission failures and preventing invalid test results.

Figure 12A:
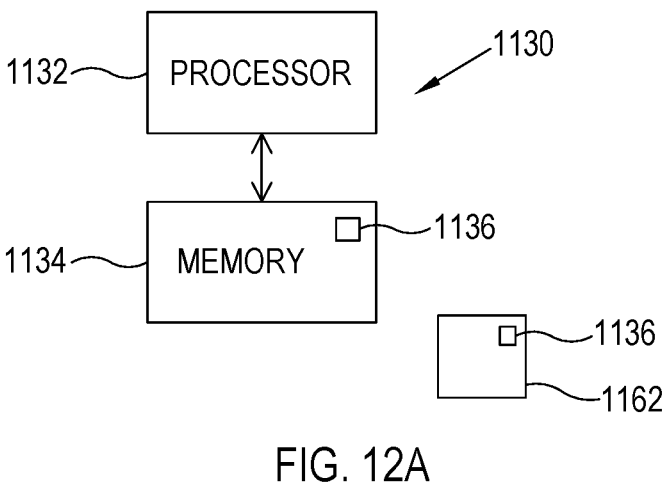
FIG. 12A shows another example of the subject matter described herein.

FIG. 12A illustrates an example of a controller 1130. The controller 1130 can be used in an apparatus such as a test equipment and/or a terminal node 110 such as a mobile terminal or UE 12. In some examples, the controller 1130 can be considered an apparatus 1130.

In some examples, the apparatus in which the controller is used comprises communication means and/or one or more transmitters and/or receivers. For example, the apparatus can comprise one or more interfaces for one or more cable connections and/or one or more antennas and/or one or more transceivers and so on.

Implementation of a controller 1130 may be as controller circuitry. The controller 1130 may be implemented in hardware alone, have certain aspects in software including firmware alone or can be a combination of hardware and software (including firmware).

As illustrated in FIG. 12A the controller 1130 may be implemented using instructions that enable hardware functionality, for example, by using executable instructions of a computer program 1136 in a general-purpose or special-purpose processor 1132 that may be stored on a computer readable storage medium (disk, memory etc.) to be executed by such a processor 1132.

The processor 1132 is configured to read from and write to the memory 1134. The processor 1132 may also comprise an output interface via which data and/or commands are output by the processor 1132 and an input interface via which data and/or commands are input to the processor 1132.

The memory 1134 stores a computer program 1136 comprising computer program instructions (computer program code) that controls the operation of the apparatus when loaded into the processor 1132. The computer program instructions, of the computer program 1136, provide the logic and routines that enables the apparatus to perform the methods illustrated in FIGS. 2 and/or 4 and/or 5 and/or 6 and/or 7 and/or 8 and/or 9 and/or and/or 11. The processor 1132 by reading the memory 1134 is able to load and execute the computer program 1136.

The apparatus therefore comprises:
at least one processor 1132; and
at least one memory 1134 including computer program code
the at least one memory 1134 and the computer program code configured to, with the at least one processor 1132, cause the apparatus at least to perform:

enabling testing of at least one user equipment over a plurality of radio frames by:

determining, for at least one candidate position in a current radio frame, if one or more signals are to be transmitted to the at least one user equipment, based, at least in part, on one or more probabilities associated with the at least one candidate position in the current radio frame;

if it is determined, for at least one candidate position in the current radio frame, that one or more signals are to be transmitted to the at least one user equipment, transmitting one or more signals to the at least one user equipment using the at least one candidate position in the current radio frame;

if it is determined, for at least one candidate position in the current radio frame, that one or more signals are not be transmitted to the at least one user equipment, determining if a maximum number of transmission failures has occurred, wherein a transmission failure is determined to have occurred when it is determined that no signals are transmitted or to be transmitted in a current radio frame; and if it is determined that a maximum number of transmission failures has occurred, transmitting one or more signals to the at least one user equipment using at least one candidate position in the current radio frame.

As illustrated in FIG. 12A, the computer program 1136 may arrive at the apparatus via any suitable delivery mechanism 1162. The delivery mechanism 1162 may be, for example, a machine-readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 1136. The delivery mechanism may be a signal configured to reliably transfer the computer program 1136. The apparatus may propagate or transmit the computer program 1136 as a computer data signal.

Computer program instructions for causing an apparatus to perform at least the following or for performing at least the following:

enabling testing of at least one user equipment over a plurality of radio frames by:

determining, for at least one candidate position in a current radio frame, if one or more signals are to be transmitted to the at least one user equipment, based, at least in part, on one or more probabilities associated with the at least one candidate position in the current radio frame;

if it is determined, for at least one candidate position in the current radio frame, that one or more signals are to be transmitted to the at least one user equipment, transmitting one or more signals to the at least one user equipment using the at least one candidate position in the current radio frame;

if it is determined, for at least one candidate position in the current radio frame, that one or more signals are not be transmitted to the at least one user equipment, determining if a maximum number of transmission failures has occurred, wherein a transmission failure is determined to have occurred when it is determined that no signals are transmitted or to be transmitted in a current radio frame; and if it is determined that a maximum number of transmission failures has occurred, transmitting one or more signals to the at least one user equipment using at least one candidate position in the current radio frame.

The computer program instructions may be comprised in a computer program, a non-transitory computer readable medium, a computer program product, a machine-readable medium. In some but not necessarily all examples, the computer program instructions may be distributed over more than one computer program.

Although the memory 1134 is illustrated as a single component/circuitry it may be implemented as one or more separate components/circuitry some or all of which may be integrated/removable and/or may provide permanent/semi-permanent/dynamic/cached storage.

Figure 12B:
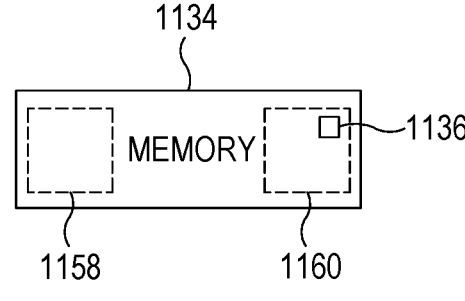
FIG. 12B shows another example of the subject matter described herein.

In examples the memory 1134 comprises a random-access memory 1158 and a read only memory 1160. In examples the computer program 1136 can be stored in the read only memory 1158. See, for example, FIG. 12B In some examples the memory 1134 can be split into random access memory 1158 and read only memory 1160.

Although the processor 1132 is illustrated as a single component/circuitry it may be implemented as one or more separate components/circuitry some or all of which may be integrated/removable. The processor 1132 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2 and/or 4 and/or 5 and/or 6 and/or 7 and/or 8 and/or 9 and/or 10 and/or 11 may represent steps in a method and/or sections of code in the computer program 1136. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Thus, the apparatus can, in examples, comprise means for:

enabling testing of at least one user equipment over a plurality of radio frames by:

determining, for at least one candidate position in a current radio frame, if one or more signals are to be transmitted to the at least one user equipment, based, at least in part, on one or more probabilities associated with the at least one candidate position in the current radio frame;

if it is determined, for at least one candidate position in the current radio frame, that one or more signals are to be transmitted to the at least one user equipment, transmitting one or more signals to the at least one user equipment using the at least one candidate position in the current radio frame;

if it is determined, for at least one candidate position in the current radio frame, that one or more signals are not be transmitted to the at least one user equipment, determining if a maximum number of transmission failures has occurred, wherein a transmission failure is determined to have occurred when it is determined that no signals are transmitted or to be transmitted in a current radio frame; and if it is determined that a maximum number of transmission failures has occurred, transmitting one or more signals to the at least one user equipment using at least one candidate position in the current radio frame.

In some examples, an apparatus can comprise means for performing one or more methods, and/or at least part of one or more methods, as disclosed herein.

In some examples, an apparatus can be configured to perform one or more methods, and/or at least part of one or more methods, as disclosed herein.

The above described examples find application as part of testing procedure of devices and components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising
at least one processor; and
at least one memory including instructions, the at least one memory and computer program code configured to, with the at least one processor, cause the apparatus at least to perform:
enabling testing of at least one user equipment over a plurality of radio frames by:
determining, for at least one candidate position in a current radio frame, if one or more signals are to be transmitted to the at least one user equipment, based, at least in part, on one or more probabilities associated with the at least one candidate position in the current radio frame;
if it is determined, for the at least one candidate position in the current radio frame, that one or more signals are to be transmitted to the at least one user equipment, transmitting the one or more signals to the at least one user equipment using the at least one candidate position in the current radio frame;
if it is determined, for the at least one candidate position in the current radio frame, that the one or more signals are not be transmitted to the at least one user equipment, determining if a maximum number of transmission failures has occurred, wherein a transmission failure is determined to have occurred when it is determined that no signals are transmitted or to be transmitted in a current radio frame; and
if it is determined that the maximum number of transmission failures has occurred, transmitting the one or more signals to the at least one user equipment using the at least one candidate position in the current radio frame.

2. The apparatus as claimed in claim 1, wherein determining, for the at least one candidate position in the current radio frame, if the one or more signals are to be transmitted to the at least one user equipment comprises determining, for a first candidate position in the current radio frame, if the one or more signals are to be transmitted to the at least one user equipment based, at least in part, on an associated probability of successful transmission.

3. The apparatus as claimed in claim 1, wherein determining, for the at least one candidate position in the current radio frame, if the one or more signals are to be transmitted to the at least one user equipment comprises determining, for a plurality of candidate positions in the current radio frame, if the one or more signals are to be transmitted to the at least one user equipment.

4. The apparatus as claimed in claim 1, wherein determining if the maximum number of transmission failures has occurred comprises determining if a number of consecutive transmission failures has reached a threshold and/or determining if a number of transmission failures within a window of one or more previous frames has reached a threshold.

5. The apparatus as claimed in claim 1, wherein different candidate positions in the current radio frame have same or different associated probabilities.

6. The apparatus as claimed in claim 1, wherein transmitting the one or more signals comprises transmitting a synchronisation signal block.

7. A non-transitory computer readable medium comprising instructions for causing an apparatus to perform at least the following:
enabling testing of at least one user equipment over a plurality of radio frames by:
determining, for at least one candidate position in a current radio frame, if one or more signals are to be transmitted to the at least one user equipment, based, at least in part, on one or more probabilities associated with the at least one candidate position in the current radio frame;
if it is determined, for the at least one candidate position in the current radio frame, that one or more signals are to be transmitted to the at least one user equipment, transmitting the one or more signals to the at least one user equipment using the at least one candidate position in the current radio frame;
if it is determined, for the at least one candidate position in the current radio frame, that the one or more signals are not be transmitted to the at least one user equipment, determining if a maximum number of transmission failures has occurred, wherein a transmission failure is determined to have occurred when it is determined that no signals are transmitted or to be transmitted in a current radio frame; and
if it is determined that the maximum number of transmission failures has occurred, transmitting the one or more signals to the at least one user equipment using the at least one candidate position in the current radio frame.

8. The non-transitory computer readable medium as claimed in claim 7, wherein the non-transitory computer readable medium comprising instructions for determining, for the at least one candidate position in the current radio frame, if the one or more signals are to be transmitted to the at least one user equipment comprises determining, for a first candidate position in the current radio frame, if the one or more signals are to be transmitted to the at least one user equipment based, at least in part, on an associated probability of successful transmission.

9. The non-transitory computer readable medium as claimed in claim 7, wherein the non-transitory computer readable medium comprising instructions for determining, for the at least one candidate position in the current radio frame, if the one or more signals are to be transmitted to the at least one user equipment comprises determining, for a plurality of candidate positions in the current radio frame, if the one or more signals are to be transmitted to the at least one user equipment.

10. The non-transitory computer readable medium as claimed in claim 7, wherein the non-transitory computer readable medium comprising instructions for determining if the maximum number of transmission failures has occurred comprises determining if a number of consecutive transmission failures has reached a threshold and/or determining if a number of transmission failures within a window of one or more previous frames has reached a threshold.

11. The non-transitory computer readable medium as claimed in claim 7, wherein different candidate positions in the current radio frame have same or different associated probabilities.

12. The non-transitory computer readable medium as claimed in claim 7, wherein transmitting the one or more signals comprises transmitting a synchronisation signal block.

* * * * *